(12) United States Patent
Lyu et al.

(10) Patent No.: US 12,541,899 B2
(45) Date of Patent: Feb. 3, 2026

(54) SYSTEMS AND METHODS FOR SIGNAL PROCESSING IN MOLECULAR IMAGING

(71) Applicant: SHANGHAI UNITED IMAGING HEALTHCARE CO., LTD., Shanghai (CN)

(72) Inventors: Xinyu Lyu, Shanghai (CN); Xuming Wang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 198 days.

(21) Appl. No.: 18/474,490

(22) Filed: Sep. 26, 2023

(65) Prior Publication Data

US 2024/0013454 A1   Jan. 11, 2024

Related U.S. Application Data

(63) Continuation of application No. PCT/CN2022/083356, filed on Mar. 28, 2022.

(30) Foreign Application Priority Data

Mar. 26, 2021   (CN) .......................... 202110325247.0

(51) Int. Cl.
*G06T 11/00*   (2006.01)
*A61B 6/03*   (2006.01)
(Continued)

(52) U.S. Cl.
CPC ........ *G06T 11/006* (2013.01); *G01T 1/20184* (2020.05); *G01T 1/247* (2013.01);
(Continued)

(58) Field of Classification Search
CPC ..... G06T 11/006; G06T 5/60; G01T 1/20184; G01T 1/247; G01T 1/17; G01T 1/2985;
(Continued)

(56) References Cited

U.S. PATENT DOCUMENTS

2011/0204245 A1   8/2011   Robert et al.
2013/0214168 A1   8/2013   Mcdaniel et al.
(Continued)

FOREIGN PATENT DOCUMENTS

CN   202177701 U   3/2012
CN   104166974 A   11/2014
(Continued)

OTHER PUBLICATIONS

International Search Report in PCT/CN2022/083356 mailed on May 30, 2022, 5 pages.
(Continued)

*Primary Examiner* — Casey Bryant
(74) *Attorney, Agent, or Firm* — METIS IP LLC

(57) ABSTRACT

Methods and systems for signal processing in molecular imaging. The system may include at least one storage device including a set of instructions and at least one processor in communication with the storage device. The at least one processor may obtain a first signal that is acquired by sampling, according to a first sampling frequency, an electrical signal of a detector. The at least one processor may also generate, based on the first signal and a target machine learning model, a second signal, the second signal corresponding to a second sampling frequency that is different from the first sampling frequency. The target machine learning model may specify a target mapping between the first signal and the second signal. The at least one processor may further generate an image based on the second signal.

20 Claims, 8 Drawing Sheets

(51) Int. Cl.
  *G01T 1/20* (2006.01)
  *G01T 1/24* (2006.01)
  *G06N 3/0464* (2023.01)
  *G06T 5/60* (2024.01)

(52) U.S. Cl.
  CPC ............. *G06N 3/0464* (2023.01); *G06T 5/60* (2024.01); *A61B 6/037* (2013.01); *G06T 2210/41* (2013.01); *G06T 2211/441* (2023.08); *G06T 2211/444* (2023.08)

(58) Field of Classification Search
  CPC .... G06N 3/0464; A61B 6/037; A61B 6/5205; A61B 6/4241
  See application file for complete search history.

(56) References Cited

U.S. PATENT DOCUMENTS

| | | | |
|---|---|---|---|
| 2018/0335510 A1 | 11/2018 | Kim et al. | |
| 2019/0059763 A1 | 2/2019 | Shakur et al. | |
| 2019/0108659 A1 | 4/2019 | Li et al. | |
| 2019/0129026 A1 | 5/2019 | Sumi et al. | |
| 2019/0326998 A1 | 10/2019 | Chen et al. | |
| 2020/0090382 A1* | 3/2020 | Huang | G06N 3/084 |
| 2020/0188692 A1 | 6/2020 | Liu | |
| 2020/0334871 A1 | 10/2020 | Su et al. | |
| 2021/0011179 A1* | 1/2021 | Nishijima | G01T 1/20184 |
| 2021/0056692 A1* | 2/2021 | Zhou | G06V 10/82 |
| 2021/0177300 A1 | 6/2021 | Samadani | |
| 2022/0383565 A1 | 12/2022 | Zhu et al. | |

FOREIGN PATENT DOCUMENTS

| | | |
|---|---|---|
| CN | 104932000 A | 9/2015 |
| CN | 106264588 A | 1/2017 |
| CN | 109523584 A | 3/2019 |
| CN | 110215203 A | 9/2019 |
| CN | 110226943 A | 9/2019 |
| CN | 110236528 A | 9/2019 |
| CN | 110477910 A | 11/2019 |
| CN | 110632641 A | 12/2019 |
| CN | 110946562 A | 4/2020 |
| CN | 111568414 A | 8/2020 |
| CN | 113057667 A | 7/2021 |
| CN | 113627547 A | 11/2021 |
| JP | H09101369 A | 4/1997 |
| JP | H09184826 A | 7/1997 |
| JP | H10118040 A | 5/1998 |
| JP | 2016015678 A | 1/2016 |
| JP | 2016080398 A | 5/2016 |
| WO | WO-2016066185 A1 * | 5/2016 ......... G01T 1/20184 |

OTHER PUBLICATIONS

Written Opinion in PCT/CN2022/083356 mailed on May 30, 2022, 5 pages.

Wang, Yue et al., Digitalizing of the Fast Electronic Pulse in PET Based on Parallel Sampling, Beijing Biomedical Engineering, 32(2): 186-190&214, 2013.

Notice of Allowance in Japanese Application No. 2023-559082 mailed on Feb. 4, 2025, 6 pages.

The Extended European Search Report in European Application No. 22774362.2 mailed on Jul. 4, 2024, 8 pages.

* cited by examiner

100

SYSTEMS AND METHODS FOR SIGNAL PROCESSING IN MOLECULAR IMAGING

CROSS-REFERENCE TO RELATED APPLICATION

This application is a Continuation of International Application No. PCT/CN2022/083356, filed on Mar. 28, 2022, which claims priority of Chinese Patent Application No. 202110325247.0, filed on Mar. 26, 2021, the contents of which are incorporated herein by reference.

TECHNICAL FIELD

This disclosure generally relates to imaging technology, and more particularly, to methods and systems for signal processing in molecular imaging.

BACKGROUND

Molecular imaging systems (e.g., a Positron Emission Tomography (PET) system) are widely used in a variety of fields including, e.g., medical treatments and/or diagnosis. A PET system may include detector(s) used for detecting radiation rays (e.g., gamma rays) emitted by a radioactive tracer that is introduced into a patient's body. A detector may include a crystal component and a photoelectric conversion component. The gamma rays may excite optical signals in the crystal component. The photoelectric conversion component (e.g., a silicon photomultiplier (SiPM)) may convert the optical signals into electrical signals. The electrical signals may be sampled for determining photon deposition information.

SUMMARY

In a first aspect of the present disclosure, a system for signal processing is provided. The system may include at least one storage device including a set of instructions and at least one processor in communication with the storage device. When executing the set of instructions, the at least one processor may be configured to perform following operations. The operations may include obtaining a first signal that is acquired by sampling, according to a first sampling frequency, an electrical signal of a detector. The operations may also include generating, based on the first signal and a target machine learning model, a second signal, the second signal corresponding to a second sampling frequency. The second sampling frequency may be different from the first sampling frequency. The target machine learning model may specify a target mapping between the first signal and the second signal. The operations may further include generating an image based on the second signal.

In some embodiments, the second sampling frequency may be higher than the first sampling frequency.

In some embodiments, the first sampling frequency may be in an order of megahertz (MHz), and the second sampling frequency may be in an order of gigahertz (GHz).

In some embodiments, the second signal may have a higher fidelity than the first signal.

In some embodiments, the generating a second signal based on the first signal and a target machine learning model may include inputting the first signal with the first sampling frequency into the target machine learning model; and outputting the second signal by the target machine learning model.

In some embodiments, the target machine learning model may provide one or more candidate mappings. The generating, based on the first signal and a target machine learning model, a second signal may include identifying, from of the one or more candidate mappings of the target machine learning model and based on the first sampling frequency, the target mapping; and generating, based on the first signal and the target mapping, the second signal.

In some embodiments, the target mapping may include a conversion function between the first signal and the second signal.

In some embodiments, the detector may be configured to detect radiation rays. The radiation rays may include incident photons deposited in the detector. The generating an image based on the second signal may include obtaining, based on the second signal, photon information of the radiation rays; and generating the image based on the photon information of the radiation rays.

In some embodiments, the photon information of the radiation rays may include at least one of deposition position information of the incident photons, energy deposition information of the incident photons, or arrival time information of the incident photons.

In some embodiments, the obtaining, based on the second signal, photon information of the radiation rays may include obtaining the deposition position information of the incident photons by processing, based on an Anger algorithm, the second signal.

In some embodiments, the obtaining, based on the second signal, photon information of the radiation rays may include obtaining the energy deposition information of the incident photons by performing an integral processing on the second signal.

In some embodiments, the obtaining, based on the second signal, photon information of the radiation rays may include identifying a time point at which an amplitude of the second signal reaches a threshold amplitude along a rising edge of the second signal; and obtaining, based on the time point, the arrival time information of the incident photons.

In some embodiments, a portion of the at least one processor may be within the detector, and the second signal may be generated by the detector.

In some embodiments, the target machine learning model may be generated according to operations including obtaining multiple groups of training samples each of which includes one or more sample signals and a reference signal corresponding to the one or more sample signals; obtaining an initial machine learning model; generating the target machine learning model by training, using the multiple groups of training samples. The one or more sample signals and the reference signals correspond to different sampling frequencies.

In a second aspect of the present disclosure, a method for signal processing is provided. The method may include obtaining, by at least one processor, a first signal that is acquired by sampling, according to a first sampling frequency, an electrical signal of the detector. The method may also include generating, based on the first signal and a target machine learning model by the at least one processor, a second signal, the second signal corresponding to a second sampling frequency. The second sampling frequency may be different from the first sampling frequency. The target machine learning model may specify a target mapping between the first signal and the second signal. The method may further include generating an image based on the second signal by the at least one processor.

In third aspect of the present disclosure, a system for signal processing is provided. The system may include an obtaining module configured to obtain a first signal that is acquired by sampling, according to a first sampling frequency, an electrical signal of a detector. The system may also include a generation module configured to generate, based on the first signal and a target machine learning model, a second signal, the second signal corresponding to a second sampling frequency. The second sampling frequency may be different from the first sampling frequency. The target machine learning model may specify a target mapping between the first signal and the second signal. The system may further include an image reconstruction module configured to generate an image based on the second signal.

In a fourth aspect of the present disclosure, a non-transitory computer readable medium is provided. The medium may include executable instructions that, when executed by at least one processor, direct the at least one processor to perform a method for signal processing as described in the first aspect of the present disclosure.

In a fifth aspect of the present disclosure, a system for signal processing is provided. The system may include at least one storage device including a set of instructions and at least one processor configured to communicate with the at least one storage device. When executing the set of instructions, the at least one processor may be configured to direct the system to perform the following operations. The operations may include obtaining multiple groups of training samples each of which includes one or more sample signals and a reference signal corresponding to the one or more sample signals. The one or more sample signals and the reference signals may correspond to different sampling frequencies. The operations may also include obtaining an initial machine learning model. The operations may also include generating a target machine learning model by training, using the multiple groups of training samples, the initial machine learning model. The target machine learning model may provide candidate mappings each of which is between signals corresponding to different sampling frequencies.

In some embodiments, a sampling frequency corresponding to the reference signal may be higher than a sampling frequency corresponding to each of the one or more sample signals.

In some embodiments, the sampling frequency corresponding to each of the one or more sample signals may be in an order of megahertz (MHz), and the sampling frequency corresponding to the reference signal may be in an order of gigahertz (GHz).

In some embodiments, the reference signal may have a higher fidelity than each of the one or more sample signals.

In some embodiments, each of the candidate mappings may include a conversion function configured to convert a sample signal of the one or more sample signals to the reference signal.

In a sixth aspect of the present disclosure, a method for signal processing is provided. The method may be implemented on a computing device including at least one storage device and at least one processor. The method may include obtaining multiple groups of training samples each of which includes one or more sample signals and a reference signal corresponding to the one or more sample signals. The one or more sample signals and the reference signals may correspond to different sampling frequencies. The method may also include obtaining an initial machine learning model. The method may further include generating a target machine learning model by training, using the multiple groups of training samples, the initial machine learning model. The target machine learning model may provide candidate mappings each of which is between signals corresponding to different sampling frequencies.

In a seventh aspect of the present disclosure, a system for signal processing is provided. The system may include an obtaining module and a training module. The obtaining module may be configured to obtaining multiple groups of training samples each of which includes one or more sample signals and a reference signal corresponding to the one or more sample signals; and obtaining an initial machine learning model. The one or more sample signals and the reference signals may correspond to different sampling frequencies. The training module may be configured to generate a target machine learning model by training, using the multiple groups of training samples, the initial machine learning model. The target machine learning model may provide candidate mappings each of which is between signals corresponding to different sampling frequencies.

In an eighth aspect of the present disclosure, a non-transitory computer readable medium is provided. The medium may include executable instructions that, when executed by at least one processor, direct the at least one processor to perform a method for signal processing as described in the sixth aspect of the present disclosure.

In a ninth aspect of the present disclosure, a detector for detecting radiation rays is provided. The detector may include one or more detection units and one or more processing circuits. Each of the one or more detection units may be configured to detect the radiation rays and generate an electrical signal. The one or more processing circuits may be configured to generate a first signal by sampling, according to a first sampling frequency, the electrical signal; and generate a second signal based on the first signal and a target machine learning model. The second signal may correspond to a second sampling frequency that is different from the first sampling frequency. The target machine learning model may specify a target mapping between the first signal and the second signal.

In some embodiments, each of the one or more detection units may include a crystal component and a photoelectric conversion component. The crystal component may be configured to absorb the radiation rays and generate, based on the absorbed radiation rays, an optical signal. The photoelectric conversion component may be configured to convert the optical signal to the electrical signal.

In some embodiments, the photoelectric conversion component may include at least one of a photomultiplier, a positive intrinsic-negative (PIN), or an avalanche photodiode (APD).

In some embodiments, the second sampling frequency may be higher than the first sampling frequency.

In some embodiments, the first sampling frequency may be in an order of megahertz (MHz), and the second sampling frequency may be in an order of gigahertz (GHz).

In some embodiments, the second signal may have a higher fidelity than the first signal.

In some embodiments, to generate a second signal based on the first signal and a target machine learning model, the one or more processing circuits may further be configured to input the first signal into the target machine learning model; and output the second signal by the target machine learning model.

In some embodiments, the target machine learning model may be configured to identify, from one or more candidate mappings of the target machine learning model and based on the first sampling frequency, the target mapping.

In some embodiments, the target mapping may include a conversion function between the first signal and the second signal.

In some embodiments, the target machine learning model may be programmed in the one or more processing circuits.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by another expression if they may achieve the same purpose.

Figure 2:
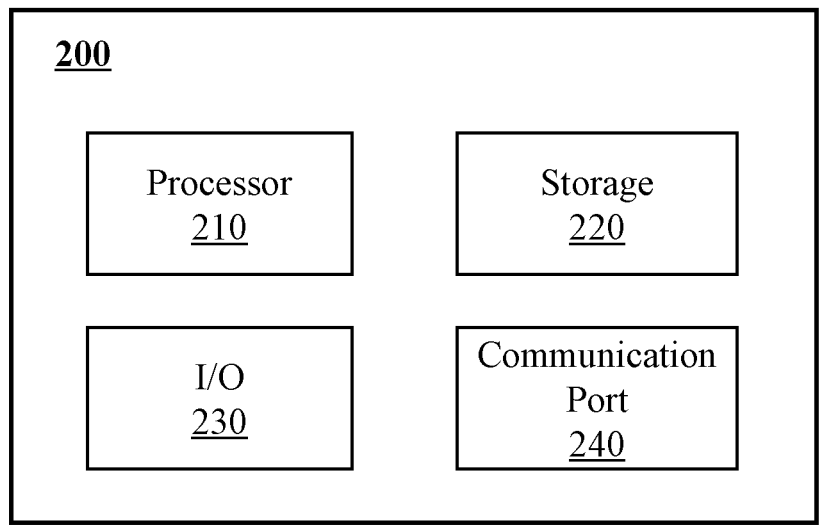
FIG. 2 is a schematic diagram illustrating hardware and/or software components of an exemplary computing device on which the processing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an Erasable Programmable Read Only Memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. For example, the expression "A and/or B" includes only A, only B, or both A and B. The character "/" includes one of the associated listed terms. The term "multiple" or "a/the plurality of" in the present disclosure refers to two or more. The terms "first," "second," and "third," etc., are used to distinguish similar objects and do not represent a specific order of the objects.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

In an existing molecular imaging system, electrical signals are mostly sampled using a low sampling frequency in order to reduce power consumption. However, the determination of the photon information using signals acquired at a low sampling frequency may result in a loss in information carried in the signals so acquired, e.g., a loss in the energy resolution of signals acquired at such a low sampling frequency by the detector.

In some embodiments, the detector of a molecular imaging system may include a plurality of detection units (e.g., hundreds of detection units). The detector units may be configured to detect radiation rays (e.g., gamma rays) and generate an electrical signal. In experimental and/or research stages, electrical signals of one or more detection units of the plurality of detection units may be sampled at a high sampling frequency. The signals so acquired may carry comprehensive information including, e.g., a high energy resolution, at the expense of high energy consumption. In view of the high energy consumption associated with signal sampling at a high sampling frequency, electrical signals sampling of the plurality of detection units of the detector at a high sampling frequency has very limited practical applications. Therefore, it is desirable to provide systems and methods for obtaining signals corresponding to a high sampling frequency under a low energy consumption, thereby improving the energy resolution of the signals from the detector, which in turn may improve the quality of an image generated based on the signals.

An aspect of the present disclosure relates to systems and methods for signal processing. The systems may include a detector and at least one processor. The detector may obtain a first signal that is acquired by sampling, according to a first sampling frequency, an electrical signal of the detector. The detector may also be configured to generate, based on the first signal and a target machine learning model, a second signal. The second signal may correspond to a second sampling frequency that is different from (e.g., higher than) the first sampling frequency. The target machine learning model may specify a target mapping between the first signal and the second signal. For example, the detector may include one or more detection units each of which is configured to generate an electrical signal in response to a radiation ray impinging on the detector unit. The detector may also include one or more processing circuits to generate the first signal and the second signal. The target machine learning model may be programmed in one or more processing circuits of the detector. Further, the at least one processor may generate an image based on the second signal. According to some embodiments of the present disclosure, by programming the target machine learning model in one or more processing circuits of the detector, the detector may directly generate signals corresponding to a high sampling frequency in real-time by converting signals acquired at a low sampling frequency, thereby obtaining, under a low energy consumption, signals corresponding to a high sampling frequency that carry information including, e.g., a high energy resolution, which in turn may improve a quality of an image generated based on the signals corresponding to the high sampling frequency.

Figure 1:
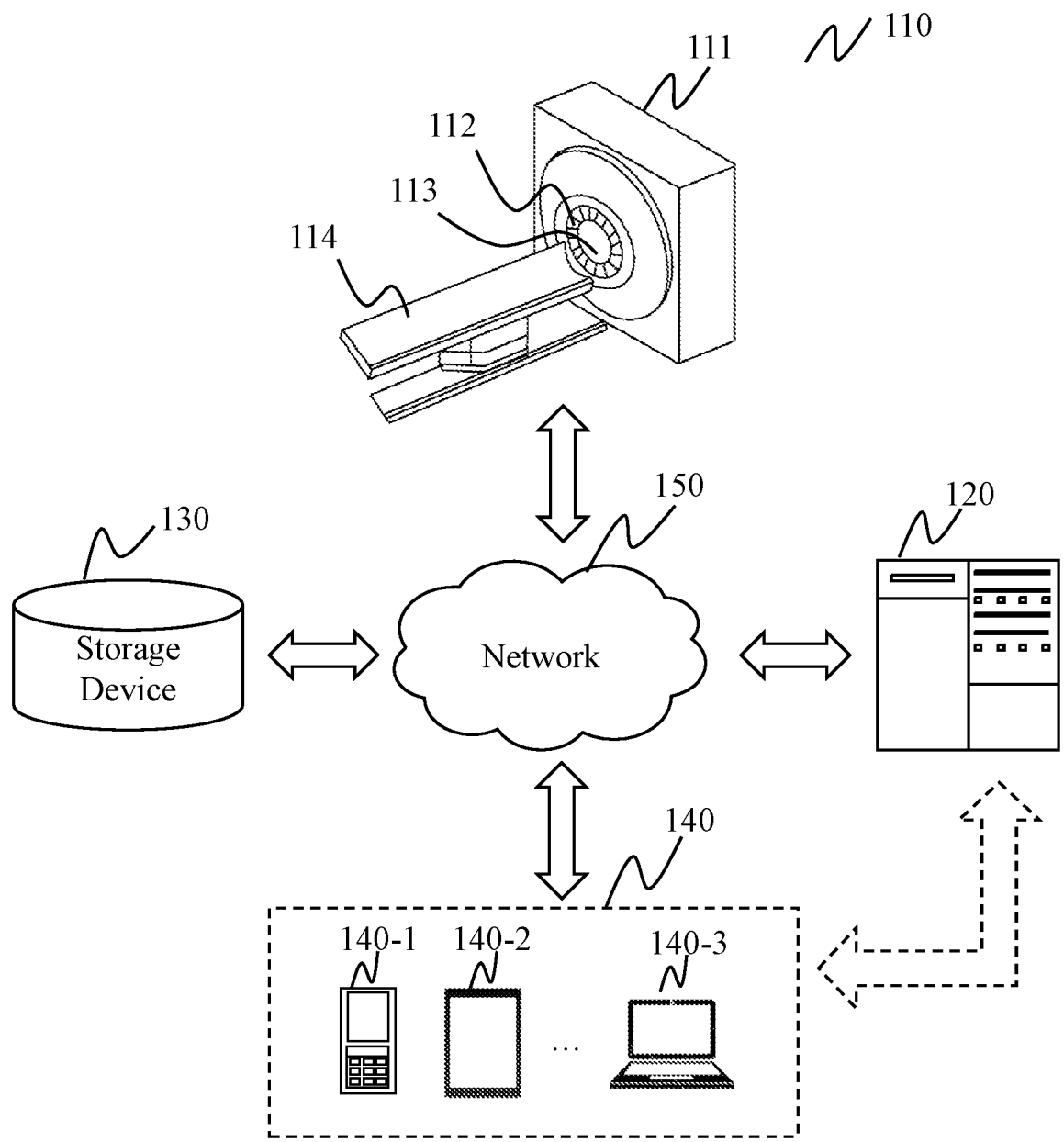
FIG. 1 is a schematic diagram illustrating an exemplary imaging system according to some embodiments of the present disclosure.

FIG. 1 is a schematic diagram illustrating an exemplary imaging system according to some embodiments of the present disclosure. In some embodiments, the imaging system 100 may include modules and/or components for performing molecular imaging and/or related analysis. For example, the imaging system 100 may be a single-modality system. Exemplary single-modality systems may include an emission computed tomography (ECT) system (e.g., a single-photon emission computed tomography (SPECT) system, a positron emission computed tomography (PET) system, etc.), a gamma camera system, etc. As another example, the imaging system 100 may be a multi-modality system. Exemplary multi-modality systems may include a computed tomography-positron emission tomography (CT-PET) system, a magnetic resonance-positron emission tomography (MR-PET) system, a computed tomography-single-photon emission computed tomography (CT-SPECT) system, etc.

For illustration purposes, as shown in FIG. 1, the imaging system 100 may include a scanner 110, a processing device 120, a storage device 130, one or more terminals 140, and a network 150. The components in the imaging system 100 may be connected in one or more of various ways. Merely by way of example, the scanner 110 may be operably connected to the processing device 120 through the network 150. As another example, the scanner 110 may be operably connected to the processing device 120 directly. As a further example, the terminal(s) 140 may be operably connected to another component of the imaging system 100 (e.g., the processing device 120) via the network 150 as illustrated in FIG. 1. As still a further example, the terminal(s) 140 may be operably connected to the processing device 120 directly as illustrated by the dotted arrow in FIG. 1. As still a further example, the storage device 130 may be operably connected to another component of the imaging system 100 (e.g., the processing device 120) directly as illustrated in FIG. 1, or through the network 150.

The scanner 110 may scan at least part of a subject, and/or generate image data relating to the subject. In some embodiments, the scanner 110 may be an imaging device, for example, a PET device, a SPECT device, a gamma camera, a PET-CT device, a PET-MRI device, etc. In the present disclosure, "object" and "subject" are used interchangeably. The subject may be biological or non-biological. For example, the subject may include a patient, a man-made object, etc. As another example, the subject may include a specific portion, organ, and/or tissue of the patient. For example, the subject may include the head, the brain, the neck, the body, a shoulder, an arm, the thorax, the heart, the stomach, a blood vessel, a soft tissue, a knee, a foot, or the like, or a combination thereof, of the patient. For illustration purposes, the following description is provided with reference to the scanner 110 being a PET device, which is not intended to limit the scope of the present disclosure.

The scanner 110 may include a gantry 111, a detector 112, a table 114, or the like, or any combination thereof. The gantry 111 may support other components of the scanner 110 including, e.g., the detector 112. The table 114 may transport a subject into or out of a detection region 113 of the scanner 110 and/or support the subject during a procedure (e.g., an imaging procedure) performed using the scanner 110. The detector 112 may detect radiation rays (e.g., gamma rays or gamma photons) emitted from the subject. For imaging, a radiopharmaceutical (e.g., a radioactive tracer) may be administered to the subject, in which the radioactive decay events of the radiopharmaceutical may produce positrons. A positron may interact with a free electron in the tissue of the subject to produce a positron-electron annihilation event and emit two oppositely directed gamma (γ) photons (also referred to as a γ photon pair). The detector 112 may detect multiple γ photons pairs of annihilation events and generate sampled signals (e.g., a digital wave signal) including photon information. The signals may be used to determine positions at which annihilation events corresponding to the multiple photon pairs occur, thereby generating an image that reflects a distribution of the radiopharmaceutical in the tissue of the subject. More descriptions regarding the detector may be found elsewhere in the present disclosure (e.g., FIGS. 4A and 4B, and the description thereof).

The processing device 120 may process data and/or information obtained from the scanner 110, the terminal(s) 140, and/or the storage device 130. For example, the processing device 120 may obtain a first signal that is sampled by the detector 112 according to a first sampling frequency. The processing device 120 may generate, based on the first signal and a target machine learning model, a second signal corresponding to a second sampling frequency that is different from the first sampling frequency. The target machine learning model may specify a target mapping between the first signal and the second signal. In such cases, the target machine learning model may be programmed in at least one processor of the processing device 120. As another example, the processing device 120 may obtain the second signal corresponding to the second sampling frequency for generating an image. The second signal may be directly generated by the detector 112. That is, the detector 112 may be configured to perform signal processing operations. The processing device 120 may be configured to perform image generation operations. For instance, the target machine learning model may be programmed in one or more processing circuits of the detector 112. The detector 112 may generate the first signal by sampling, according to the first sampling frequency, an electrical signal of the detector 112. The detector 112 may generate the second signal based on the first signal and the target machine learning model programmed in the detector 112. The processing device 120 may generate an image based on the second signal. In some embodiments, the processing device 120 may transmit the image to the terminal(s) 140 for display on one or more display devices in the terminal(s) 140.

In some embodiments, the processing device 120 may obtain the target machine learning model by training an initial machine learning model using a plurality of groups of training samples (also referred to as training groups). The target machine learning model may be updated from time to time, e.g., periodically or not, based on training groups that are at least partially different from the original training groups from which the target machine learning model is determined. For instance, the target machine learning model may be updated based on a new training group that is not in the original training groups. In some embodiments, the determination and/or updating of the target machine learning model may be performed on a processing device, while the application of the target machine learning model may be performed on a different processing device. In some embodiments, the determination and/or updating of the target machine learning model may be performed on a processing device of a system different from the imaging system 100 on which the application of the target machine learning model is performed. For instance, the determination and/or updating of the target machine learning model may be performed on a first system of a vendor who provides and/or maintains such a machine learning model and/or has access to training groups used to determine and/or update the target machine learning model, while the application of the provided machine learning model may be performed on a second system of a client of the vendor. In some embodiments, the determination and/or updating of the target machine learning model may be performed online in response to a request for signal processing. In some embodiments, the determination and/or updating of the target machine learning model may be performed offline.

In some embodiments, the processing device 120 may be a single server or a server group. The server group may be centralized or distributed. In some embodiments, the processing device 120 may be local or remote. For example, the processing device 120 may access information and/or data stored in the scanner 110, the terminal(s) 140, and/or the storage device 130 via the network 150. As another example, the processing device 120 may be directly connected to the scanner 110, the terminal(s) 140 and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented by a computing device 200 having one or more components as illustrated in FIG. 2.

The storage device 130 may store data, instructions, and/or any other information. In some embodiments, the storage device 130 may store data obtained from the terminal(s) 140 and/or the processing device 120. For example, the storage device 130 may store scan data obtained from the scanner 110. As another example, the storage device 130 may store a target machine learning model as described elsewhere in the present disclosure. In some embodiments, the storage device 130 may store data and/or instructions that the processing device 120 may execute or use to perform exemplary methods described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be operably connected to the network 150 to communicate with one or more other components of the imaging system 100 (e.g., the processing device 120, the terminal(s) 140). One or more components of the imaging system 100 may access the data or instructions stored in the storage device 130 via the network 150. In some embodiments, the storage device 130 may be directly connected to or communicate with one or more other components of the imaging system 100 (e.g., the processing device 120, the terminal(s) 140). In some embodiments, the storage device 130 may be part of the processing device 120.

Figure 3:
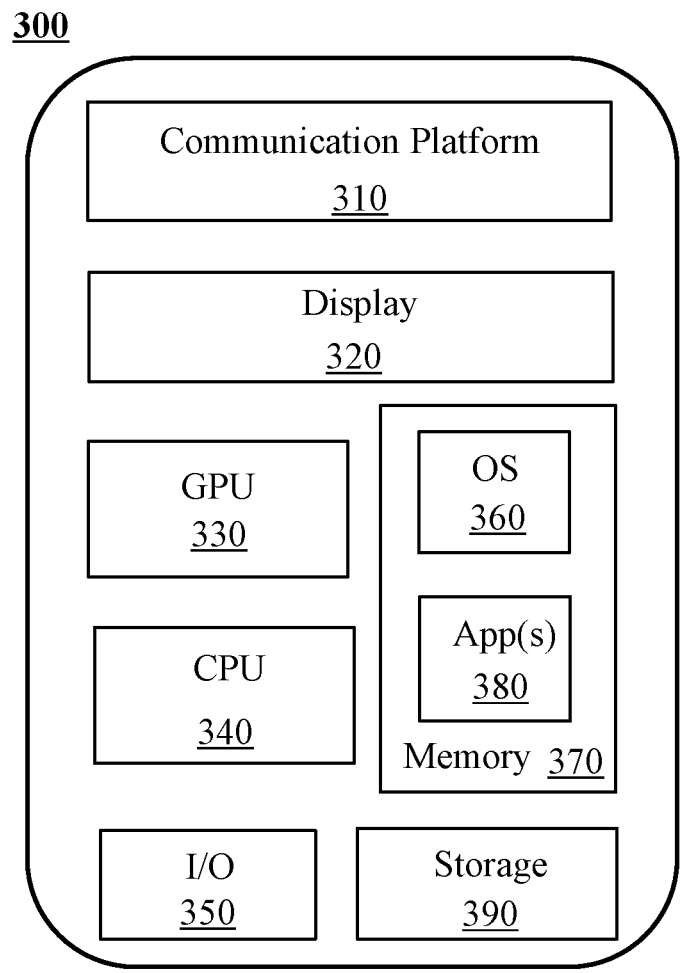
FIG. 3 is a schematic diagram illustrating hardware and/or software components of an exemplary mobile device according to some embodiments of the present disclosure.

The terminal(s) 140 may include a mobile device 140-1, a tablet computer 140-2, a laptop computer 140-3, or the like, or any combination thereof. In some embodiments, the mobile device 140-1 may include a smart home device, a wearable device, a mobile device, a virtual reality device, an augmented reality device, or the like, or any combination thereof. Merely by way of example, the terminal(s) 140 may include a mobile device as illustrated in FIG. 3. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footwear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 140 may be part of the processing device 120.

In some embodiments, the terminal(s) 140 may send and/or receive information for signal processing to the processing device 120 via a user interface. The user interface may be in the form of an application for signal processing implemented on the terminal(s) 140. The user interface implemented on the terminal(s) 140 may be configured to facilitate communication between a user and the processing device 120. In some embodiments, a user may input a request for imaging via the user interface implemented on the terminal(s) 140. The terminal(s) 140 may send the request for imaging to the processing device 120 for trigger signal processing based on a target machine learning model as described elsewhere in the present disclosure (e.g., FIGS. 5A, 5B, and 6, and the descriptions thereof). In some embodiments, the user may input and/or adjust parameters (e.g., weights) of the target machine learning model via the user interface. In some embodiments, the user interface may facilitate the presentation or display of information and/or data relating to signal processing received from the processing device 120. For example, the information and/or data may include a result generated by the processing device 120. For instance, the result may include one or more images (e.g., 2D images, 3D images, etc.), signals, etc.

The network 150 may include any suitable network that can facilitate the exchange of information and/or data for the imaging system 100. In some embodiments, one or more components of the imaging system 100 (e.g., the scanner 110, the terminal(s) 140, the processing device 120, the storage device 130, etc.) may communicate information and/or data with one or more other components of the imaging system 100 via the network 150. For example, the processing device 120 may obtain image data from the scanner 110 via the network 150. As another example, the processing device 120 may obtain user instructions from terminal(s) 140 via the network 150. The network 150 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

It should be noted that the above description regarding the imaging system is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the imaging system may include one or more additional components, and/or one or more components of the imaging system described above may be omitted. In some embodiments, a component of the imaging system may be implemented on two or more sub-components. Two or more components of the imaging system may be integrated into a single component. In some embodiments, though the present disclosure is provided with reference to the imaging system 100 for molecular imaging, the methods and systems disclosed herein may be applied in various imaging systems which include a detector involving an analog-digital conversion.

For example, the method for signal processing may be applied in a CT detector, an X-ray detector, etc.

FIG. 2 is a schematic diagram illustrating exemplary hardware and/or software components of an exemplary computing device according to some embodiments of the present disclosure. The computing device 200 may be configured to implement any component of the imaging system. For example, the scanner 110, the terminal 140, the processing device 120, and/or the storage device 130 may be implemented on the computing device 200. Although only one such computing device is shown for convenience, the computer functions relating to the imaging system as described herein may be implemented in a distributed fashion on a number of similar platforms, to distribute the processing load. As illustrated in FIG. 2, the computing device 200 may include a processor 210, a storage device 220, an input/output (I/O) 230, and a communication port 240.

The processor 210 may execute computer instructions (e.g., program codes) and perform functions of the processing device 120 in accordance with techniques described herein. The computer instructions may include, for example, routines, programs, objects, components, signals, data structures, procedures, modules, and functions, which perform particular functions described herein. In some embodiments, the processor 210 may perform instructions obtained from the terminal 140 and/or the storage device 130. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage device 220 may store data/information obtained from the scanner 110, the terminal 140, the storage device 130, or any other component of the imaging system 100. In some embodiments, the storage device 220 may include a mass storage device, a removable storage device, a volatile read-and-write memory, a read-only memory (ROM), or the like, or any combination thereof. For example, the mass storage device may include a magnetic disk, an optical disk, a solid-state drive, a mobile storage device, etc. The removable storage device may include a flash drive, a floppy disk, an optical disk, a memory card, a ZIP disk, a magnetic tape, etc. The volatile read-and-write memory may include a random access memory (RAM). The RAM may include a dynamic RAM (DRAM), a double date rate synchronous dynamic RAM (DDR-SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 220 may store one or more programs and/or instructions to perform exemplary methods described in the present disclosure.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, a camera capturing gestures, or the like, or a combination thereof. Exemplary output devices may include a display device, a loudspeaker, a printer, a projector, a 3D hologram, a light, a warning light, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the scanner 110, the terminal 140, the storage device 130, or any external devices (e.g., an external storage device, or an image/data processing workstation). The connection may be a wired connection, a wireless connection, or a combination of both that enables data transmission and reception. The wired connection may include an electrical cable, an optical cable, a telephone wire, or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

In some embodiments, the computing device 200 may further include a bus (not shown) configured to achieve the communication between the processor 210, the storage device 220, the I/O 230, and/or the communication port 240. The bus may include hardware, software, or both, which decouple the components of the computing device 200 to each other. The bus may include at least one of a data bus, an address bus, a control bus, an expansion bus, or a local bus. For example, the bus may include an accelerated graphics port (AGP) or other graphics bus, an extended industry standard architecture (EISA) bus, a front side bus (FSB), a hyper transport (HT) interconnection, an industry standard architecture (ISA) bus, a front side bus (FSB), an Infiniband interconnection, a low pin count (LPC) bus, a storage bus, a micro channel architecture (MCA) bus, a peripheral component interconnect (PCI) bus, a PCI-Express (PCI-X) bus, a serial advanced technology attachment (SATA) bus, a video electronics standards association local bus (VLB) bus, or the like, or any combination thereof. In some embodiments, the bus may include one or more buses. Although specific buses are described, the present disclosure may consider any suitable bus or interconnection.

FIG. 3 is a schematic diagram illustrating exemplary hardware and/or software components of an exemplary mobile device on which the terminal 140 may be implemented according to some embodiments of the present disclosure. As illustrated in FIG. 3, the mobile device 300 may include a communication unit 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system (OS) 370 (e.g., iOS™, Android™, Windows Phone™ etc.) and one or more applications (App(s)) 380 may be loaded into the memory 360 from the storage 390 in order to be executed by the CPU 340. The applications 380 may include a browser or any other suitable mobile apps for receiving and rendering information relating to image processing or other information from the processing device 120. User interactions with the information stream may be achieved via the I/O 350 and provided to the processing device 120 and/or other components of the imaging system 100 via the network 150. In some embodiments, a user may input parameters to the imaging system 100, via the mobile device 300.

In order to implement various modules, units and their functions described above, a computer hardware platform may be used as hardware platforms of one or more elements (e.g., the processing device 120 and/or other components of the imaging system 100 described in FIG. 1). Since these hardware elements, operating systems and program languages are common; it may be assumed that persons skilled in the art may be familiar with these techniques and they may be able to provide information needed in the image processing operations according to the techniques described in the present disclosure. A computer with the user interface may be used as a personal computer (PC), or other types of workstations or terminal devices. After being properly programmed, a computer with the user interface may be used as a server. It may be considered that those skilled in the art may also be familiar with such structures, programs, or general operations of this type of computing device.

Figure 4A:
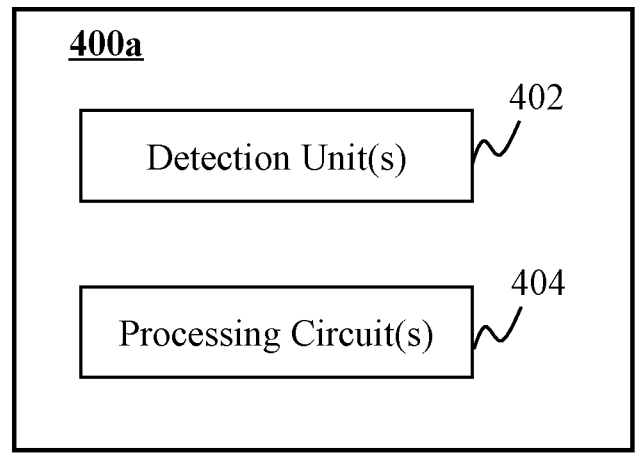
FIG. 4A is a block diagram illustrating an exemplary detector according to some embodiments of the present disclosure.

FIG. 4A is a schematic diagram illustrating an exemplary detector according to some embodiments of the present disclosure. The detector 400a is an exemplary configuration of the detector 112. The detector 400a may be configured to detect radiation rays (e.g., gamma rays or gamma photons) emitted from annihilation events in a subject after the subject is injected into a radiopharmaceutical. As shown FIG. 4A, the detector 400a may include one or more detection units 402 and one or more processing circuits 404 operably connected to the one or more detection units 402. Each of the detection units 402 may correspond to one of the one or more processing circuits 404. For example, the count (or number) of the one or more detection units 402 may be equal to the count (or number) of the one or more processing circuits 404.

A detection unit 402 may be configured to detect the radiation rays (e.g., gamma rays or gamma photons) and generate an electrical signal (e.g., an analog signal such as an electrical pulse). In some embodiments, a detection unit 402 may include one or more crystal components and one or more photoelectric conversion components (e.g., a crystal component and a photoelectric conversion component, multiple crystal components and a photoelectric conversion component, etc.). The crystal component(s) may be configured to absorb the radiation rays (e.g., gamma rays) and generate, based on the absorbed radiation rays, an optical signal (e.g., a fluorescence signal). The photoelectric conversion component(s) may be configured to convert the optical signal to an electrical signal. For example, the crystal component(s) may convert radiation rays (e.g., gamma rays or gamma photons produced by the radiopharmaceutical and impinging on the crystal component(s)) to visible light, and the photoelectric conversion component(s) may convert the visible light to an electrical signal.

In some embodiments, the crystal component of a detector unit 402 may include a scintillator. Exemplary materials suitable for the scintillator may include sodium iodide (NaI), cesium iodide (CsI), lanthanum bromide (LaBr3), lanthanum chloride (LaCl3), cerium bromide (CeBr3), lutetium oxyorthosilicate (Lu2SiO5), lutetium orthosilicate (LSO) lutetium yttrium orthosilicate (LYSO), lutetium pyrosilicate, bismuth germanate (BGO), gadolinium orthosilicate (GSO), lutetium gadolinium orthosilicate, barium fluoride (BaF2), yttrium aluminate (YAlO3), or the like, or any combination thereof. In some embodiments, the photoelectric conversion component(s) may include a photomultiplier (e.g., a photomultiplier tube (PMT), a silicon photomultiplier (SiPM), etc.), a positive intrinsic-negative (PIN), an avalanche photodiode (APD), or the like, or any combination thereof.

In some embodiments, a detection unit 402 may include a semiconductor layer that is configured to directly convert radiation rays (e.g., gamma photons) into an electrical signal. Exemplary materials of the semiconductor layer may include silicon (Si), gallium arsenide (GaAs), cadmium telluride (CdTe), cadmium zinc telluride (CdTeZn), or the like, or any combination thereof.

The one or more processing circuits 404 may be configured to collect and/or process electrical signals generated by the one or more detection units 402. In some embodiments, a processing circuit 404 may receive an electrical signal from its corresponding detection unit 402. The processing circuit 404 may perform a sampling operation on the electrical signal. For instance, the processing circuit 404 may sample the electrical signal according to a first sampling frequency and generate a first signal. The first signal may include a digital signal (e.g., a digital wave signal). The sampling operation may refer to an operation that converts an analog signal to a digital signal. As still another example, a processing circuit 404 of the detector 400a may perform signal generation operations. For instance, a processing circuit 404 may obtain the first signal that is acquired, according to the first sampling frequency, an electrical signal of the detector 400a. The processing circuit 404 may generate a second signal based on the first signal and a target machine learning model. The second signal may be a digital signal (e.g., a digital wave signal) corresponding to a second sampling frequency. The second sampling frequency may be different from (e.g., higher than) the first sampling frequency.

The target machine learning model may be a trained machine learning model that provides one or more candidate mappings (e.g., a plurality of candidate mappings) each of which is between signals corresponding to different sampling frequencies. The target machine learning model may specify a target mapping between the first signal and the second signal. For instance, the target machine learning model may be configured to identify, from the plurality of candidate mappings of the target machine learning model and based on the first sampling frequency, the target mapping.

In some embodiments, the target machine learning model may be programmed in the one or more processing circuits 404. For instance, the target machine learning model may be applied to process the first signal. For instance, the first signal with the first sampling frequency may be input into the target machine learning model to generate the second signal. In some embodiments, the one or more processing circuits 404 may output the first signal and/or the second signal for further processing (e.g., for image reconstruction).

In some embodiments, a processing circuit 404 may include an integrated circuit, e.g., an application-specific integrated circuit (ASIC), a field-programmable gate array (FPGA), etc. For example, the target machine learning model may be programmed in the FPGA of each of at least one of the one or more processing circuits 404. In some embodiments, a processing circuit 404 may include one or more processing units (or modules). The one or more processing units may include a front-end electronics module and a back-end electronics module. The front-end electronics module may be configured to perform an operation on an analog signal (e.g., the electrical signal generated by a detection unit 402). For example, the front-end electronics module may include an amplifier configured to perform an amplification operation on the electrical signal. As another example, the front-end electronics module may include a filter configured to perform a noise filtering operation on the electrical signal. As still another example, the front-end electronics module may include a discriminator (e.g., a constant-fraction discriminator) configured to perform a digital discrimination operation on the electrical signal. As a further example, the front-end electronics module may include a sampling unit configured to convert an analog signal (e.g., the electrical signal or a processed electrical signal by the front-end electronics module) to a digital signal (e.g., the first signal). The front-end electronics module may be configured to perform digital processing operations on a digital signal (e.g., the first signal and/or the second signal). For example, the back-end electronics module may include a conversion unit configured to convert a first digital signal (e.g., the first signal) to a second digital signal (e.g., the second signal). As another example, the back-end electronics module may include a postprocessing unit configured to determine photon information of the radiation rays (e.g., the gamma rays) based on a digital signal (e.g., the first signal or the second signal). The photon information may be further processed (e.g., calibrated and/or corrected) by an energy-time calibration system to generate event information to obtain information of coincidence events. As still another example, the back-end electronics module may include a readout unit configured to output a digital signal (e.g., the first signal and/or the second signal), the photon information of the radiation rays that is determined based on the digital signal, and/or the information of coincidence events for further data processing (e.g., image reconstruction).

Figure 4B:
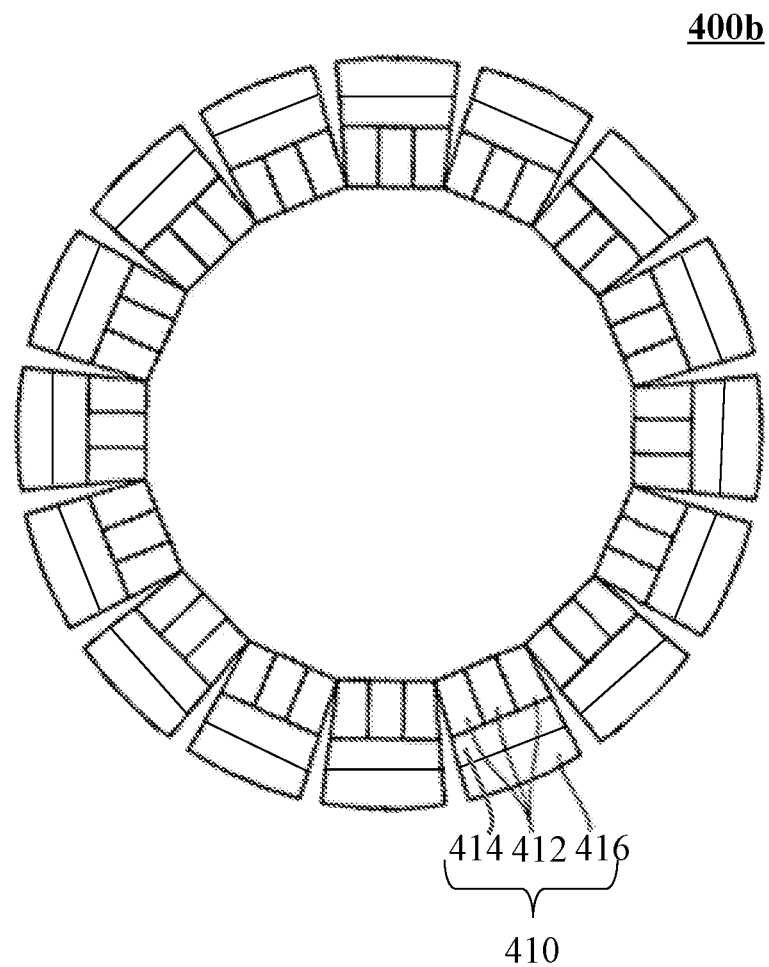
FIG. 4B is a schematic diagram illustrating an exemplary detector according to some embodiments of the present disclosure.

In some embodiments, a detection unit 402 and its corresponding processing circuit 404 may be packaged to form a detector block. That is, the detector 400a may include one or more detector blocks (e.g., a plurality of detector blocks). The plurality of detector blocks may be arranged in a suitable manner, for example, a ring, an arc, a rectangle, an array, or the like, or any combination thereof. For illustration purposes, FIG. 4B illustrates an exemplary detector according to some embodiments. The detector 400b may be an exemplary configuration of the detector 400a or the detector 112. As shown in FIG. 4B, the detector 400b may include a plurality of detector blocks 410 arranged to form a detector ring. A detector block 410 may include a detection unit and a processing circuit 416. In some embodiments, a detection unit of a detector block 410 may include multiple crystal components 412 and a photoelectric conversion component 414. The multiple crystal components 412 may absorb radiation rays (e.g., gamma rays or gamma photons) and generate optical signals. The photoelectric conversion component 414 may convert the optical signals to an electrical signal (e.g., an analog signal). The processing circuit 416 may generate a first signal by sampling, according to a first sampling frequency, the electrical signal. The processing circuit 416 may also generate, based on the first signal and a target machine learning model, a second signal corresponding to a second sampling frequency that is higher than the first sampling frequency. The target machine learning model may be programmed in the processing circuit 416. More descriptions regarding the crystal components 412, the photoelectric conversion component 414, and the processing circuit 416 of the detector 400b may be found elsewhere in the present disclosure (e.g., FIG. 4A and relevant descriptions thereof).

It should be noted that the above descriptions of the detector 400a and the detector 400b are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the detector 400a or the detector 400b may include one or more additional components, and/or one or more components of the detector 400a or 400b may be omitted. For example, the detector 400a may include a cooling component configured to cool the detection unit(s) 402 of the detector 400a. In some embodiments, the detector 400a or the detector 400b may transmit the first signal to a processing device 120 of the imaging system 100 for signal processing. For example, the target machine learning model may be not programmed in the processing circuit(s) of the detector 400a or the detector 400b. The first signal may be processed, based on the target machine learning model by the processing device 120, to generate the second signal.

Figure 5A:
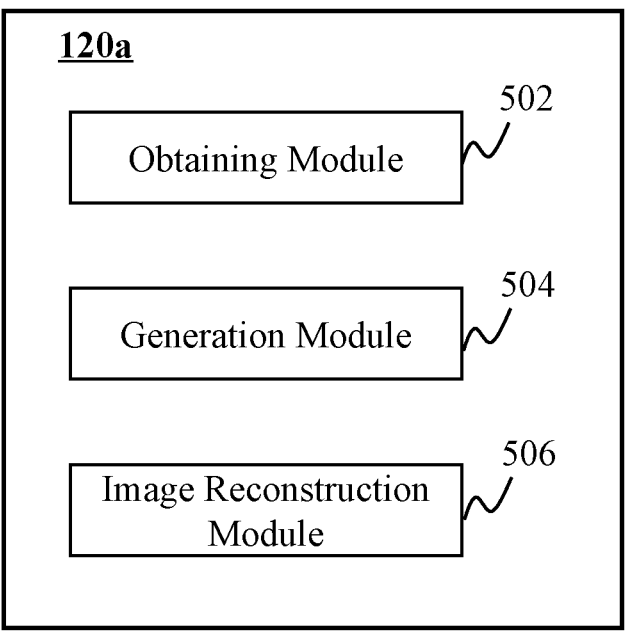
FIGS. 5A and 5B are block diagrams illustrating exemplary processing devices according to some embodiments of the present disclosure.
Figure 5B:
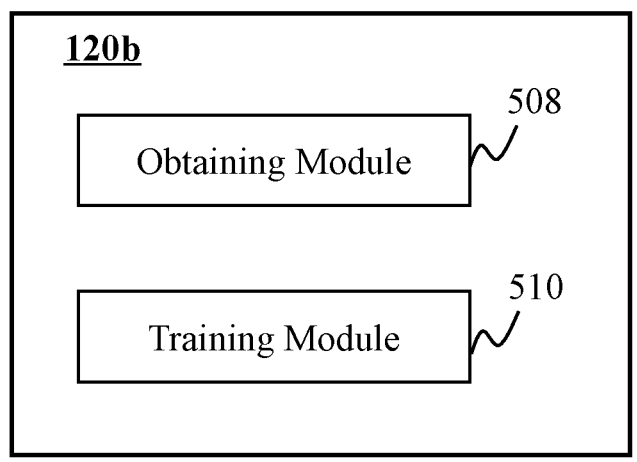

FIGS. 5A and 5B are block diagrams illustrating exemplary processing devices according to some embodiments of the present disclosure. In some embodiments, the processing devices 120a and 120b may be embodiments of the processing device 120 as described in connection with FIG. 1. In some embodiments, the processing devices 120a and 120b may be respectively implemented on a processing unit (e.g., the processor 210 illustrated in FIG. 2 or the CPU 340 as illustrated in FIG. 3). Merely by way of example, the processing device 120a may be implemented on a CPU 340 of a terminal device, and the processing device 120b may be implemented on a computing device 200. Alternatively, the processing devices 120a and 120b may be implemented on a same computing device 200 or a same CPU 340. For example, the processing devices 120a and 120b may be implemented on a same computing device 200.

The processing device 120a may include an obtaining module 502, a generation module 504, and an image reconstruction module 506.

The obtaining module 502 may be configured to obtain data/information relating to signal processing in the imaging system 100. For example, the obtaining module 502 may obtain a first signal corresponding to a first sampling frequency from a detector (e.g., the detector 112, 400a, or 400b) of the imaging system 100. As another example, the obtaining module 502 may obtain the first signal from a storage device as disclosed in the present disclosure (e.g., the storage device 130, the storage device 220, the storage 390, etc.). More descriptions regarding the obtaining of the first signal may be found elsewhere in the present disclosure (e.g., operation 602 and the description thereof).

The generation module 504 may be configured to generate a second signal corresponding to a second sampling frequency. The second sampling frequency may be different from (e.g., higher than) the first sampling frequency. For example, the generation module 504 may generate the second signal based on the first signal and a target machine learning model. The target machine learning model may use the first signal (with the first sampling frequency and/or the second sampling frequency) as an input and generate the second signal as an output. The target machine learning model may be a deep learning model. More descriptions regarding the target machine learning model and the generation of the second signal may be found elsewhere in the present disclosure (e.g., operation 604 and the descriptions thereof).

The image reconstruction module 506 may be configured to perform image generation operations. For example, the image reconstruction module 506 may generate an image based on second signal(s) that correspond to a plurality of radiation rays (e.g., gamma rays emitted from a subject). For instance, the image reconstruction module 506 may determine, based on the second signal(s), coincidence event(s) relating to the plurality of radiation rays. The image reconstruction module 506 may generate image data based on the coincidence event(s). The image reconstruction module 506 may generate the image based on the image data using one or more algorithms. More descriptions regarding the generation of the image based on the second signal(s) may be found elsewhere in the present disclosure (e.g., operation 606 and the description thereof).

The processing device 120b may include an obtaining module 508 and a training module 510. The obtaining module 508 may be configured to obtain information/data relating to model training. For example, the obtaining module 508 may obtain multiple groups of training samples. A group of training samples may include one or more sample signals and a reference signal corresponding to the one or more sample signals. The one or more sample signals and/or the reference signal of a training sample may be in the form of a digital signal (e.g., a digital wave signal) that is generated by sampling a sample analog signal (e.g., a sample electrical signal or a sample electrical pulse). More descriptions regarding the obtaining of the multiple groups of training samples may be found elsewhere in the present disclosure (e.g., operation 702 and the description thereof). As another example, the obtaining module 508 may obtain an initial machine learning model to be trained. The initial machine learning model may be a deep learning model. More descriptions regarding the obtaining of the initial machine learning model may be found elsewhere in the present disclosure (e.g., operation 704 and the description thereof).

The training module 510 may be configured to generate a target machine learning model. For example, the training module 510 may generate the target machine learning model by training, using the multiple groups of training samples, the initial machine learning model. As another example, the training module 510 may update the target machine learning model. More descriptions regarding the generation and/or updating of the target machine learning model may be found elsewhere in the present disclosure (e.g., operation 706 and the description thereof).

The modules in the processing devices 120a and 120b may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. In some embodiments, the processing device 120 may include one or more additional modules. For example, the processing device 120 may include a storage module (not shown) used to store information and/or data (e.g., the first signal, the second signal, the image). In some embodiments, two or more of the modules may be combined into a single module, and any one of the modules may be divided into two or more units. For example, the obtaining module 502 and the obtaining module 508 may be combined as a single module or be the same module that has functions of both the obtaining module 502 and the obtaining module 508. In some embodiments, the generation module 504 may be omitted in the processing device 120a. For example, the target machine learning model may be programmed in a detector (e.g., the detector 112, 400a, or 400b) for processing the first signal. The processing device 120a may directly obtain the second signal from the detector for further processing. In some embodiments, the obtaining module 502 and the generation module 504 may be a portion of the detector.

Figure 6:
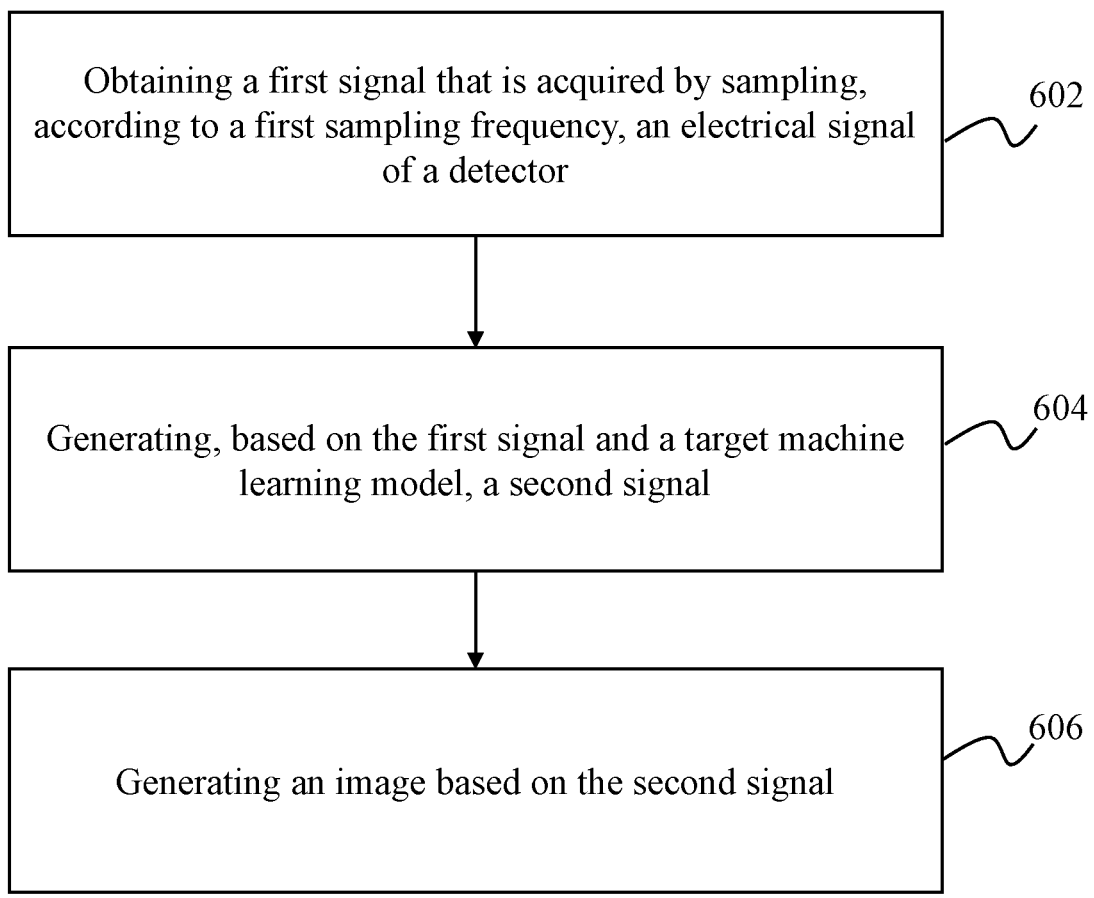
FIG. 6 is a flowchart illustrating an exemplary process for reconstructing an image according to some embodiments of the present disclosure.

FIG. 6 is a flowchart illustrating an exemplary process for reconstructing an image according to some embodiments of the present disclosure. In some embodiments, one or more operations of process 600 illustrated in FIG. 6 may be implemented in the imaging system 100 illustrated in FIG. 1. For example, process 600 illustrated in FIG. 6 may be stored in the storage device 130 in the form of instructions, and invoked and/or executed by the processing device 120 (e.g., the processor 210 of the computing device 200 as illustrated in FIG. 2, the GPU 330 or CPU 340 of the mobile device 300 as illustrated in FIG. 3, and or the modules of the processing device 120a as illustrated in FIG. 5A). As another example, a portion of the process 600 may be performed by the detector of the scanner 110 (e.g., the detector 112, the detector 400a, or the detector 400b), and a portion of the process 600 may be performed by the processing device 120.

In 602, a first signal may be obtained. The first signal may be acquired by sampling, according to a first sampling frequency, an electrical signal of a detector (e.g., the detector 112, the detector 400a, or the detector 400b). In some embodiments, the first signal may be obtained by the processing device 120a (e.g., the obtaining module 502). In some embodiments, the first signal may be obtained by the detecto120r 112 (e.g., the processing circuit(s) 404 of the detector unit(s) 400a, the processing circuit 416(s) of the detector unit(s) 400b).

In some embodiments, the electrical signal of the detector may refer to an analog signal (e.g., an electrical pulse) generated by a detection unit (e.g., a detection unit 402 as illustrated in FIG. 4A), and also be referred to as a target electrical signal. Merely by way of an example, crystal component(s) of a detection unit 402 may absorb the radiation rays (e.g., gamma rays) impinging on the crystal component(s) and convert the radiation rays (e.g., gamma rays) to visible light. A photoelectric conversion component of the detection unit 402 may convert the visible light to the electrical signal. The electrical signal may include or carry photon information of the detected radiation rays (e.g., gamma rays). In some embodiments, the electrical signal may include different stages including, e.g., a rising edge (e.g., low-to-high transition) and a falling edge (e.g., highto-low transition). There may be more high-frequency information in the rising edge of the electrical signal than in the falling edge of the electrical signal, corresponding to that the amplitude of the electrical signal along the rising edge of the electrical signal changes more rapidly than the amplitude of the electrical signal along the falling edge of the electrical signal.

In some embodiments, the first signal may refer to a digital signal (e.g., a digital wave signal) obtained based on the electrical signal. The first signal may also be referred to as a first wave signal. A processing circuit (e.g., a processing circuit 404 as described in FIG. 4A) of the detector may generate the first signal by sampling, according to a first sampling frequency, the electrical signal. The first sampling frequency may be a relatively low sampling frequency under which the detector may have a low energy consumption for sampling and generating the first signal. For example, the first sampling frequency may be in an order of megahertz (MHz), e.g., 10 MHz, 20 MHz, etc. In some embodiment, according to the first sampling frequency, the detector may obtain a first plurality of sampling points to generate the first signal. The first sampling frequency may indicate a time interval between two adjacent sampling points of the first plurality of sampling points. The higher the first sampling frequency is, the shorter the time interval between two adjacent sampling points of the first plurality of sampling points may be. In some embodiments, the first sampling frequency may be set according to a default setting of the detector or adjusted according to different situations. In some embodiments, the first signal may be generated by sampling the electrical signal at different stages of the electrical signal. For example, as the amplitude along the rising edge of the electrical signal may change more rapidly than the amplitude along the falling edge of the electrical signal, the processing circuit(s) of the detector may sample the electrical signal at its rising edge to generate the first signal, such that the first signal may include or preserve more information that the electrical signal carries than a first signal generated by sampling the electrical signal along its falling edge.

In some embodiments, the processing device 120a may obtain the first signal from one or more components of the imaging system 100. For example, the processing device 120a may obtain the first signal from the detector in response that the detector generates the first signal. As another example, the detector may generate the first signal and store the first signal in a storage device disclosed in the present disclosure (e.g., the storage device 130, the storage device 220, the storage 390, etc.). The processing device 120a may retrieve the first signal from the storage device. In some embodiments, the first signal may remain in and be further processed by the detector, e.g., the processing circuit (s) of the detector.

In 604, a second signal may be generated based on the first signal and a target machine learning model. In some embodiments, the second signal may be generated by the processing device 120a (e.g., the generation module 504). In some embodiments, the second signal may be generated by the detector 112 (e.g., the processing circuit(s) 404 of the detector unit(s) 400a, the processing circuit(s) 416 of the detector unit(s) 400b).

In some embodiments, the second signal may correspond to a second sampling frequency that is different from the first sampling frequency. The second signal may refer to an estimated digital signal (e.g., an estimated digital wave signal) that corresponds to the second sample frequency. The second signal may also be referred to as a second wave signal. For example, the second sampling frequency may be higher than the first sampling frequency. That is, the second sampling frequency may refer to a relatively high sampling frequency in comparison with the first sampling frequency. For example, the second sampling frequency may be in an order of gigahertz (GHz), e.g., 1 GHz, 10 GHz, etc. In some embodiments, the second signal may include a second plurality of sampling points. A time interval between two adjacent sampling points of the second plurality of sampling points may be shorter than the time interval between two adjacent sampling points of the first plurality of sampling points corresponding to the first signal. The count (or number) of the second plurality of sampling points within a time period may be greater than the count (or number) of the first plurality of sampling points corresponding to the first signal within the same time period. Accordingly, the second signal may include more high-frequency information that the electrical signal carries than the first signal. In some embodiments, the second sampling frequency may be set according to a default setting of the imaging system 100 or adjusted according to different situations.

In some embodiments, the target machine learning model may be configured to use a specific first digital signal corresponding to a specific first sampling frequency (e.g., the first signal obtained corresponding to the first sampling frequency) as an input and generate a specific second digital signal corresponding to a specific second sampling frequency (e.g., the second signal corresponding to the second sampling frequency) as an output. The target machine learning model may specify a target mapping between the first signal and the second signal. In other words, the target machine learning model may be used to convert a specific first digital signal into a specific second digital signal based on the target mapping. As used herein, a mapping may include a conversion function configured to convert a first digital signal to a second digital signal. For example, the target mapping may include a conversion function between the first signal and the second signal.

In some embodiments, the target machine learning model may provide one or more (e.g., a plurality of) candidate mappings each of which is between signals corresponding to different sampling frequencies. The target machine learning model may be configured to identify, from the one or more of candidate mappings of the target machine learning model, the target mapping. For example, the one or more candidate mappings may include mappings of different first sampling frequencies to a same second sampling frequency. The first signal with the first sampling frequency may be input into the target machine learning model on the basis of which the second signal may be generated. For instance, the target machine learning model may be configured to identify, from the one or more candidate mappings of the target machine learning model and based on the first sampling frequency, the target mapping. The target machine learning model may process the first signal based on target mapping. As another example, the one or more candidate mappings may include mappings of different first sampling frequencies to different second sampling frequencies. The first signal with the first sampling frequency and information of a desired second sampling frequency may be input into the target machine learning model, on the basis of which the second signal corresponding to the desired second sampling frequency may be generated. For instance, the target machine learning model may be configured to identify, from the plurality of candidate mappings of the target machine learning model and based on the first sampling frequency and the desired second sampling frequency, the target mapping. The target machine learning model may process the first signal based on target mapping. Alternatively, the target machine learning model may provide the one or more (e.g., a plurality of) candidate mappings, and the processing device 120a may generate the second signal based on the one or more candidate mappings and the first signal, more descriptions of which may be found elsewhere in the present disclosure (e.g., FIG. 10 and the description thereof).

In some embodiments, the processing device 120a may obtain the target machine learning model from one or more components of the imaging system 100. For example, the target machine learning model may be stored in a storage device disclosed in the present disclosure (e.g., the storage device 130, the storage device 220, the storage 390, etc.). The processing device 120a may retrieve the target machine learning model from the storage device 130. As another example, the processing device 120a may obtain the target machine learning model from the training module 510 of the processing device 120b. In some embodiments, the target machine learning model may be programmed in the detector, e.g., the processing circuit(s) of the detector.

In some embodiments, the training module 510 may generate the target machine learning model by training an initial machine learning model based on multiple groups of training samplings using a model training algorithm. Exemplary model training algorithms may include a gradient descent algorithm, a Newton's algorithm, a Quasi-Newton algorithm, a Levenberg-Marquardt algorithm, a conjugate gradient algorithm, or the like, or a combination thereof. More descriptions of the generation of the target machine learning model may be found elsewhere in the present disclosure (e.g., FIG. 7 and the descriptions thereof).

In 606, the processing device 120a (e.g., the image reconstruction module 506) may generate an image based on the second signal.

In some embodiments, the processing device 120a may obtain, based on the second signal, photon information of the radiation rays (e.g., gamma rays and gamma photons) that are produced by annihilation event(s). The processing device 120a may generate the image based on the photon information of the radiation rays. The radiation rays may include incident photons (e.g., gamma photons) deposited in (or interacted with) the detector. The photon information of the radiation rays may include deposition position information of the incident photons, energy deposition information of the incident photons, arrival time information of the incident photons, or the like, or any combination thereof. The deposition position information of the incident photons may include position(s) (or interactive position(s)) at which the incident photons are absorbed and deposited in the detector (e.g., crystal component(s) of the detector). The incident photons may be deposited at a single position or multiple positions of the detector. The energy deposition information of an incident photon may refer to an amount of energy that is deposited/exchanged at the position when the incident photon is deposited at the position. The arrival time information of an incident photon may refer to the time at which the incident photon impinges on the detector.

For example, the processing device 120a may obtain the energy deposition information of the incident photons by performing an integral processing on the second signal. As another example, the processing device 120a may obtain the deposition position information of the incident photons by processing, based on an Anger algorithm, the second signal. For instance, a scintillation detector (i.e., a detector including one or more scintillators) may be used for position determination, e.g., for detecting or determining the deposition position information of the incident photons. A deviation from the deposition position information of the incident photons may cause a reduction in a quality of the image generated based on the deposition position information of the incident photons. Therefore, it is desirable to increase the energy resolution of the signal to obtain more accurate data for image reconstruction.

When a radiation ray (e.g., a gamma ray) interacts with the scintillator, a photoelectric conversion component operably coupled to the scintillator may output an electrical signal. Generally, the barycenter approach is used to determine the deposition position information of the incident photons (e.g., incident positions of radiation rays (e.g., the gamma rays) corresponding to the incident photons). In practical applications, there may be three types of interaction between a radiation ray (e.g., a gamma ray) and the scintillator: a photoelectric effect, a Compton scattering, and an electron pair effect. The electron pair effect may usually occur for the radiation ray (e.g., the gamma ray) of a high energy level. The photoelectric effect and the Compton scattering may be two most dominant types of interaction. When the photoelectric effect occurs, the energy of a radiation ray (e.g., a gamma ray) may be entirely deposited in the scintillator where the radiation ray (e.g., the gamma ray) initially interacts with the detector, then the initial interaction position of the radiation ray (e.g. the gamma ray) may be accurately found according to the barycenter approach. When the Compton scattering occurs, the energy of a radiation ray (e.g., a gamma ray) may be deposited in two or more scintillators. In such cases, the interaction position(s) of the radiation ray (e.g., the gamma ray) determined using the barycenter position of the deposition energy (i.e., the position of the scintillator) as the initial interaction position may be likely inaccurate, which may result in an error in the determined deposition position information of the radiation ray (e.g., the gamma ray). Accordingly, the deposition position information of the radiation ray (e.g., the gamma ray) may need to be determined after a Compton scattering sequence (e.g., a sequence indicating interaction time points when the radiation ray (e.g., the gamma ray) interacts with the two or more scintillators) is recovered. The conventional Anger algorithm may offer limited or no Compton scattering sequence recovery. The effect of the conventional Anger algorithm may be equivalent to assigning the barycenter of the deposited energy (i. e. the position of the scintillator) as the initial interaction location. For example, when there are multiple scintillators absorbing the Compton scattering energy of a radiation ray (e.g., a gamma ray), a plurality of PMTs or SiPMs corresponding to the multiple scintillators may produce different electrical signals. The Anger algorithm may be used to determine the interactive energy of the radiation ray (e.g., the gamma ray) by summing up the electrical signals of the plurality of PMTs or SiPMs, and determine the interaction position of the radiation ray (e.g., the gamma ray) by averaging positions of the plurality of PMTs or SiPMs that are weighted based on, e.g., the strengths of the signals they have detected. As still another example, the processing device 120a may identify a time point at which an amplitude of the second signal reaches a threshold amplitude along a rising edge of the second signal. The processing device 120a may obtain, based on the time point, the arrival time information of the incident photons. For example, the processing device 120a may designate the time point as the arrival time of the incident photons.

In some embodiments, as described in connection with FIGS. 4A and 4B, the detector may include multiple detector blocks. A detector block may receive a plurality of radiation rays (e.g., gamma photons emitted from the subject) and generate electrical signals in response to the plurality of radiation rays (e.g., gamma rays). The processing device 120a may process the electrical signals to obtain photon information of the plurality of radiation rays (e.g., gamma rays). The processing device 120a may determine one or more coincidence events based on the interaction positions and the interaction times of the plurality of radiation rays. If two radiation rays impinge on and interact with two scintillators of the detector within a certain time window (e.g., 1 nanosecond, 2 nanoseconds, 5 nanoseconds, 10 nanoseconds, 20 nanoseconds, etc.), the two radiation rays may be determined to come from a same annihilation and regarded as a coincidence event. The coincidence event may be assigned to a line of response (LOR) joining the two relevant scintillators that detect the coincidence event. The processing device 120a may project the coincidence events that are assigned to the same LOR and generate image data relating to a plurality of LORs. Further, the processing device 120a may generate the image based on the image data using one or more algorithms including, for example, a denoising algorithm, a reconstruction algorithm, a correction algorithm, etc. Exemplary reconstruction algorithms may include an iterative reconstruction algorithm (e.g., a maximum likelihood expectation maximization (MLEM) algorithm, an ordered subset expectation maximization (OSEM) algorithm), a filtered back projection (FBP) algorithm, a 3D reconstruction algorithm, or the like, or any combination thereof. Exemplary correction algorithms may include a random correction, a scatter correction, an attenuation correction, a dead time correction, normalization, or the like, or any combination thereof.

It should be noted that the above descriptions of process 600 are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, a portion of the operation 606 may be performed by the detector. For example, the detector may obtain, based on the second signal, photon information of the radiation rays. The detector may generate the image data relating to a plurality of LORs based on the photon information of the radiation rays. Then, the processing device 120a may obtain the image data and generate the image based on the image data. As another example, the operation 606 may be performed by the detector. That is, both the signal generation operation and the image generation operation may be performed by the detector (e.g., be performed by one or more processing circuits of the detector). In some embodiments, the operation 606 may be omitted. An operation for generating image data based on the second signal may be added after operation 604. In such cases, the process 600 may be implemented by one or more processing circuits of the detector.

Figure 7:
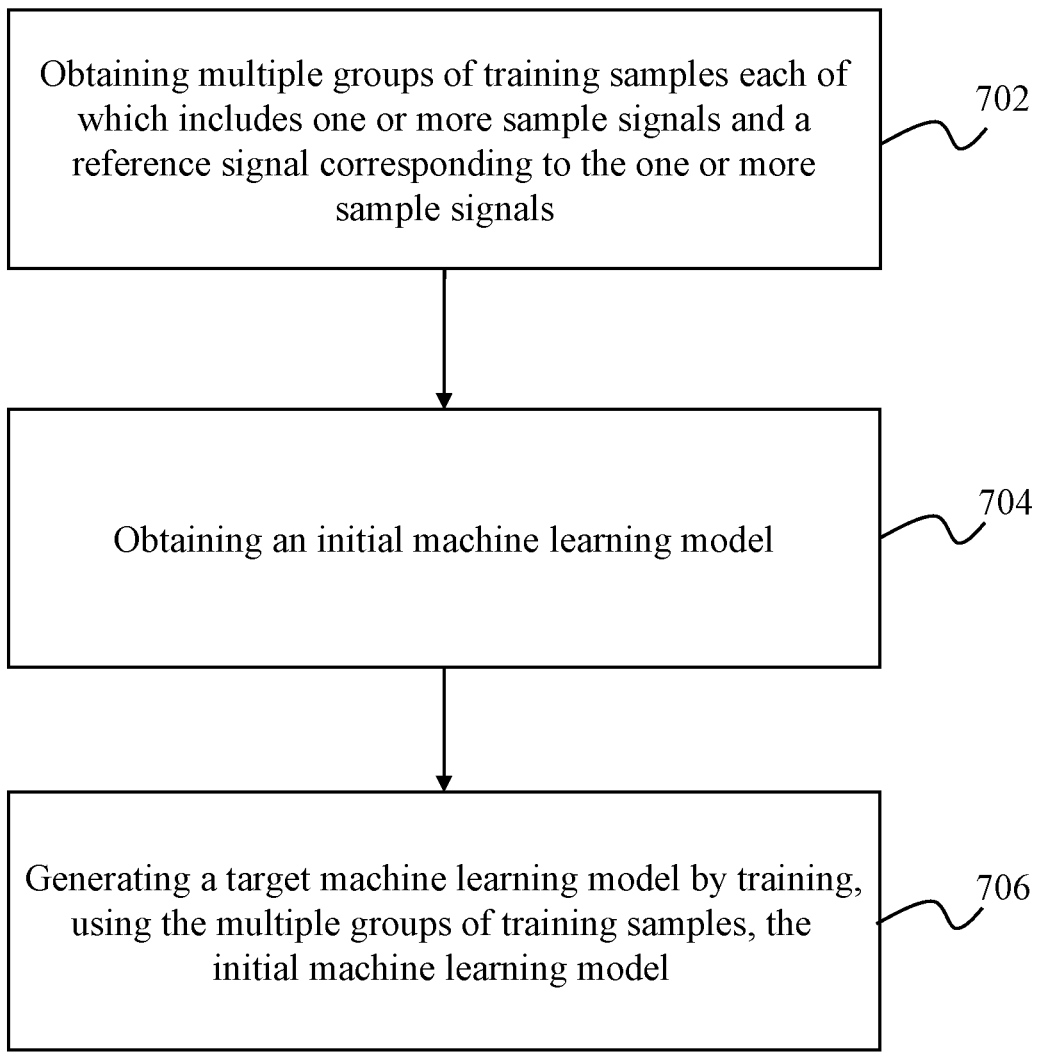
FIG. 7 is a flowchart illustrating an exemplary process for generating a target machine learning model according to some embodiments of the present disclosure.

FIG. 7 is a flowchart illustrating an exemplary process for generating a target machine learning model according to some embodiments of the present disclosure. In some embodiments, one or more operations of process 700 illustrated in FIG. 7 may be implemented in the imaging system 100 illustrated in FIG. 1. For example, process 700 illustrated in FIG. 7 may be stored in the storage device 130 in the form of instructions, and invoked and/or executed by the processing device 120 (e.g., the processor 210 of the computing device 200 as illustrated in FIG. 2, the GPU 330 or CPU 340 of the mobile device 300 as illustrated in FIG. 3, or modules of the processing device 120b as illustrated in FIG. 5B). In some embodiments, a portion of operation 604 illustrated in FIG. 6 may be performed according to the process 700. For example, the target machine learning model as described in operation 604 may be determined according to process 700.

In 702, the processing device 120b (e.g., the obtaining module 508) may obtain multiple groups of training samples. A group of training samples may include one or more sample signals and a reference signal corresponding to the one or more sample signals.

As used herein, the one or more sample signals and/or the reference signal may be in the form of a digital signal (e.g., a digital wave signal) that is generated by sampling a sample analog signal (e.g., a sample electrical signal or a sample electrical pulse). In some embodiments, the one or more sample signals and the reference signals may correspond to different sampling frequencies. A sampling frequency corresponding to a sample signal may also be referred to as a training sampling frequency. A sampling frequency corresponding to the reference signal may also be referred to as a reference sampling frequency. For instance, the one or more sample signals may be acquired by sampling, according to one or more different training sampling frequencies, respectively, a sample electrical signal of a detector, respectively. The reference signal may be acquired by sampling, according to a reference sampling frequency, the sample electrical signal. The reference sampling frequency may be different from each of the one or more different training sampling frequencies. For example, the reference sampling frequency may be higher than each of the one or more different training sampling frequencies. Each of the one or more different training sampling frequencies may be in an order of megahertz (MHz), which is similar to the first sampling frequency as described in operation 602. The reference sampling frequency may be in an order of gigahertz (GHz), which is similar to the second sampling frequency as described in operation 604.

Figure 8A:
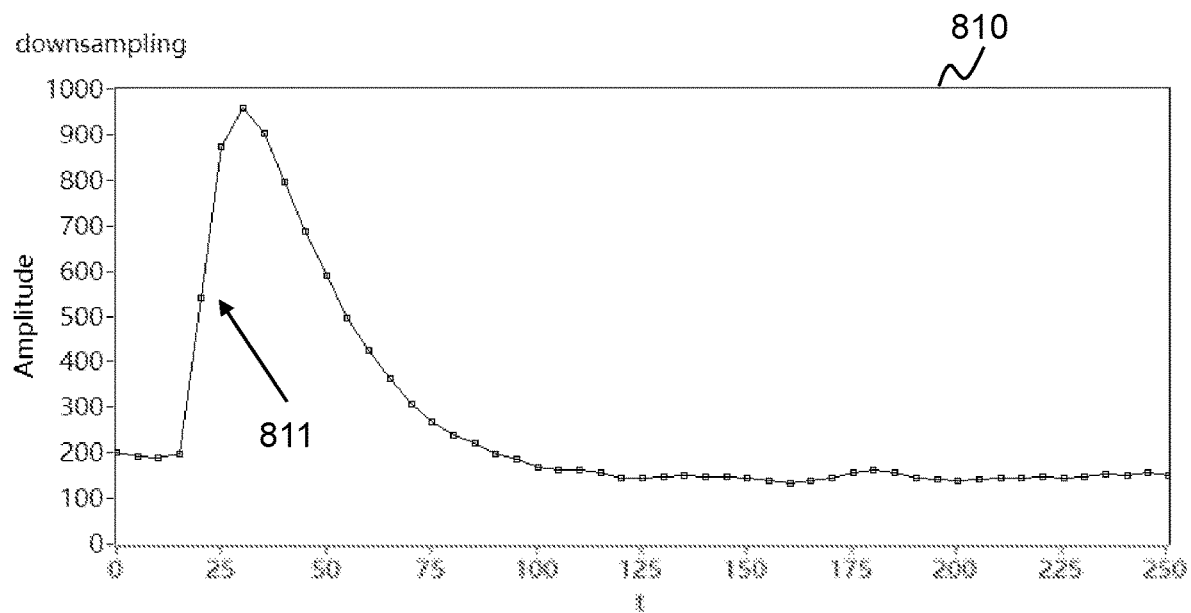
FIG. 8A is a schematic diagram illustrating an exemplary sample signal according to some embodiments of the present disclosure.
Figure 8B:
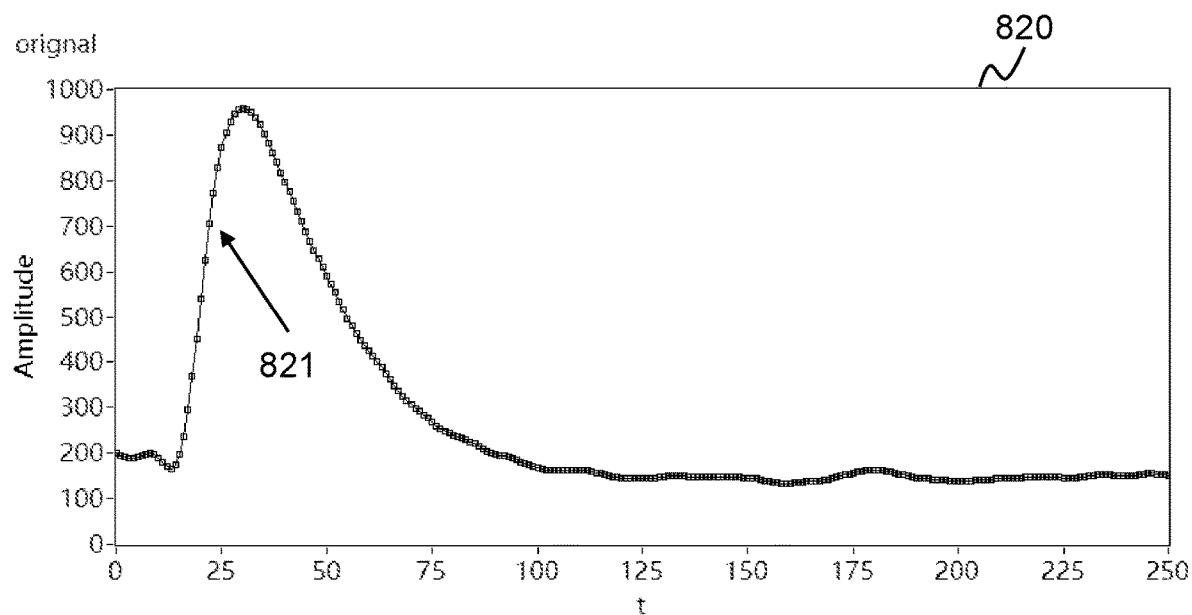
FIG. 8B is a schematic diagram illustrating an exemplary a reference signal according to some embodiments of the present disclosure.

In some embodiments, as the reference sampling frequency may be higher than each of the one or more different training sampling frequencies, the reference signal may have a higher fidelity than each of the one or more sample signals. FIG. 8A illustrates an exemplary sample signal and FIG. 8B illustrates an exemplary reference signal corresponding to the sample signal as illustrated in FIG. 8A. The sample signal 810 may be generated by sampling, according to a training sampling frequency, a specific sample electrical signal. The sample signal 810 may also be referred to as a downsampling signal. The sample signal 810 may include a first plurality of sampling points 811 as illustrated by the open circles in the curve in FIG. 8A. The reference signal 820 may be generated by sampling, according to a reference sampling frequency that is higher than the training sampling frequency, the specific sample electrical signal. The reference signal 820 may also be referred to as an original signal. The reference signal may include a second plurality of sampling points 821 as illustrated by the open circles in the curve in FIG. 8B. The count (or number) of the first plurality of sampling points 811 with a time period may be lower than the count (or number) of the second plurality of sampling points 821 within the same time period. Thus, the reference signal 820 may include or preserve more information carried in the specific sample electrical signal than the sample signal 810, i.e., the reference signal 820 may have a higher fidelity than sample signals 810. It should be noted that, though the sample signal 810 and the reference signal 820 are generated by sampling the sample electrical signal at both the rising edge and the falling edge of the sample electrical signal, a sample signal and its corresponding reference signal of a group of training sample may be generated by sampling a sample electrical signal at its rising edge only.

In some embodiments, a sample electrical signal may be generated by a detection unit of a sample detector (e.g., an experimental detector, a detector operated under an experimental setting, or a detector the same as a type of the detector described in FIG. 6) for detecting radiation rays (e.g., gamma rays) that are incident on the sample detector. The radiation rays may be emitted from a sample subject. As used herein, the sample subject may be similar to a subject as described elsewhere in the present disclosure. For example, the sample detector may be configured with a plurality of channels for sampling a sample electrical signal according to the one or more different training sampling frequencies and the reference sampling frequency. In some embodiments, the sample subject may be injected with different doses of a radioactive tracer for multiple times. After each injection, one group of the multiple groups of training samples may be generated by sampling, according to the one or more different training sampling frequencies and the reference sampling frequency, electrical signals corresponding to radiation rays (e.g., gamma rays emitted from the sample subject) that impinge on a sample detector. In some embodiments, there may be multiple sample subjects, and each of the multiple sample subjects may be injected with a same or different doses of a radioactive tracer for detection. After each injection, one group of the multiple groups of training samples may be generated by sampling, according to the one or more different training sampling frequencies and the reference sampling frequency, electrical signals corresponding to radiation rays (e.g., gamma rays emitted from one of the multiple sample subjects) that impinge on the sample detector. In some embodiments, for a sample signal of the one or more sample signals corresponding to a specific training sampling frequency, the same sample subject may be injected with a same dose of a radioactive tracer for multiple times. After each injection, radiation rays (e.g., gamma rays emitted from the sample subject) may be detected by a same sample detector to generate electrical signals. The electrical signals may be sampled according to the specific training sampling frequency to generate an initial sample signal. The sample signal may be determined based on the multiple initial sample signals (e.g., by averaging the multiple initial sample signals). Similarly, the reference signal may be determined based on multiple initial reference signals. In some embodiments, the sample detector may not be configured with a channel for for sampling according to the reference sampling frequency (e.g., for energy consumption reasons). The reference signal may be generated based on multiple sample signals (e.g., the one or more sample signals within a same group as the reference signal). As each of the multiple sample signals corresponds to different training sampling frequencies, the multiple sample signals may have overlapping or different frequency information of the sample electrical signal, the reference signal may be generated based on the multiple sample signals. For example, the reference signal may be generated to include frequency information of the multiple signals, such that the reference signal may have a better fidelity than each of the multiple sample signals. As another example, the multiple sample signals may include a first sample signal corresponding to a first training sample frequency and a second sample signal corresponding to a second training sample frequency. The first training sample frequency may be lower than the may the second training sample frequency. The first sample signal may not include peak information of the sample electrical signal, while the second sample signal may include the peak information of the sample electrical signal. The reference information may be generated based on the first sample signal and the second sample signal to include more information than each of the first sample signal and the second sample signal.

In some embodiments, the multiple groups of training samples may be stored in a storage device (e.g., the storage device 130, the storage device 220, the storage 390, etc. of the imaging system 100 or an external storage device that the processing device 120*a* can access). The processing device 120*b* may retrieve the multiple groups of training samples from the storage device.

In 704, the processing device 120*b* (e.g., the obtaining module 508) may obtain an initial machine learning model.

In some embodiments, the initial machine learning model may be a deep learning model. For instance, the initial machine learning model may be constructed based on at least one of a convolutional machine learning model (CNN), a fully convolutional neural network (FCN) model, a generative adversarial network (GAN), a back propagation (BP) machine learning model, a radial basis function (RBF) machine learning model, a deep belief nets (DBN) machine learning model, an Elman machine learning model, or the like, or a combination thereof, as exemplified in FIG. 9 and the description thereof. In some embodiments, the initial machine learning model may include multiple layers, for example, an input layer, multiple hidden layers, and an output layer. The multiple hidden layers may include one or more convolutional layers, one or more pooling layers, one or more batch normalization layers, one or more activation layers, one or more fully connected layers, a cost function layer, etc. Each of the multiple layers may include a plurality of nodes. The initial machine learning model may be trained to take a digital signal as an input and another digital signal as an output.

In some embodiments, the initial machine learning model may be defined by a plurality of architecture parameters and a plurality of learning parameters. The plurality of learning parameters may be altered during the training of the initial machine learning model using the multiple groups of training samples, while the plurality of architecture parameters may not be altered during the training of the initial machine learning model using the multiple groups of training samples. The plurality of architecture parameters may be set and/or adjusted by a user before the training of the initial machine learning model. Exemplary architecture parameters of the initial machine learning model may include the size of a kernel of a layer, the total count (or number) of layers, the count (or number) of nodes in each layer, a learning rate, a minibatch size, an epoch, etc. Exemplary learning parameters of the initial machine learning model may include a connected weight between two connected nodes, a bias vector relating to a node, etc. The connected weight between two connected nodes may be configured to represent a proportion of an output value of a node to be as an input value of another connected node. The bias vector relating to a node may be configured to control an output value of the node deviating from an origin.

In 706, the processing device 120*b* (e.g., the training module 510) may generate a target machine learning model by training, using the multiple groups of training samples, the initial machine learning model.

In some embodiments, the initial machine learning model may be trained using a training algorithm. Exemplary training algorithm may include a gradient descent algorithm, a Newton's algorithm, a Quasi-Newton algorithm, a Levenberg-Marquardt algorithm, a conjugate gradient algorithm, or the like, or a combination thereof. In some embodiments, the initial machine learning model may be trained by performing a plurality of iterations based on a cost function. Before the plurality of iterations, the plurality of learning parameters of the initial machine learning model may be initialized (e.g., based on a Gaussian random algorithm, a Xavier algorithm, etc.) Then the plurality of iterations may be performed to update the plurality of learning parameters of the initial machine learning model until a termination condition is satisfied. The termination condition may provide an indicator of whether the initial machine learning model is sufficiently trained. For example, the termination condition may be satisfied if the value of the cost function associated with the initial machine learning model is minimal or smaller than a threshold (e.g., a constant). As another example, the termination condition may be satisfied if the value of the cost function converges. The convergence may be deemed to have occurred if the variation of the values of the cost function in two or more consecutive iterations is smaller than a threshold (e.g., a constant). As still an example, the termination condition may be satisfied when a specified number of iterations are performed in the training process.

Merely by way of example, the termination condition includes that the value of the cost function is below a threshold. For each of the plurality of iterations, one or more sample signals and a reference signal in a group of training samples may be inputted into the initial machine learning model. The one or more sample signals and the reference signal may be processed by one or more layers of the initial machine learning model (or an intermediate machine learning model generated in a previous iteration) to generate one or more estimated signals each of which corresponds to one of the one or more sample signals. Each of the one or more estimated signals may be compared with the reference signal based on the cost function of the initial machine learning model (or an intermediate machine learning model generated in a previous iteration). The cost function of the initial machine learning model (or an intermediate machine learning model generated in a previous iteration) may be configured to assess a difference between an estimated value (e.g., each of the one or more estimated signals) of the initial machine learning model (or an intermediate machine learning model generated in a previous iteration) and a desired value (e.g., the reference signal). If the value of the cost function exceeds a threshold in a current iteration, the plurality of learning parameters of the initial machine learning model (or an intermediate machine learning model generated in a previous iteration) may be adjusted and updated to cause the value of the cost function (i.e., the difference between each of the one or more estimated signals and the reference signal) smaller than the threshold. Accordingly, in a next iteration, another group of training samples may be inputted into the initial machine learning model (or an intermediate machine learning model generated in a previous iteration) as described above until the termination condition is satisfied.

In some embodiments, the processing device 120*b* may designate the trained machine learning model as the target machine learning model. The target machine learning model may provide one or more candidate mappings each of which is between signals (e.g., digital signals) corresponding to different sampling frequencies. Each of the candidate mappings may include a conversion function configured to convert a first signal (e.g., a sample signal of the one or more sample signals) corresponding to a first sampling frequency to a second signal (e.g., the reference signal corresponding to the sample signal) corresponding to a second sampling frequency that is different from the first sampling frequency. The target machine learning model may be configured to identify, based on a sampling frequency of an input signal and a desired sampling frequency of an output signal, a target mapping from the one or more candidate mappings.

In some embodiments, each of the one or more candidate mappings of the target machine learning model may be trained in a separate training process. In a training process of a candidate mapping specifying a conversion from a signal A of a sampling frequency A to a signal B of a sampling frequency B, sample signals of the sampling frequency A and reference signals of the reference sampling frequency B may be used. The training process may be iterative. Multiple pairs each including a sample signal of the sampling frequency A and a corresponding reference signal of the reference sampling frequency B may be used in one iteration of the iterative training process. Such multiple pairs may be retrieved from the multiple groups of training samples. Alternatively, each of the one or more candidate mappings may be trained in a separate training process and the one or more candidate mappings may correspond to different target machine learning models. That is, there may be one or more target machine learning models each of which provides a candidate mapping between digital signals corresponding to two different sampling frequencies.

In some embodiments, the target machine learning model may be updated according to an instruction of a user, clinical demands, availability of updated groups of training samples, groups of added samples (e.g., the first signal obtained in 602 and the second signal generated in 604) over a period of time, or according to a schedule set based on a default setting of the imaging system 100. For example, the target machine learning model may be updated at set intervals (e.g., every other month, every two months, etc.). As another example, the target machine learning model may be updated based on groups of added samples over a period of time (e.g., every other month, every two months, etc.). If the amount of the groups of added samples over a period of time is greater than a threshold, the target machine learning model may be updated based on the groups of added samples.

It should be noted that the above descriptions of the process 700 are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the training sampling frequency and/or the reference sampling frequency may be inputted into the initial machine learning model along with the sample signal and the reference signal. In some embodiments, before the trained machine learning model is designated as the target machine learning model, the trained machine learning model may be tested using one or multiple groups of validation samples. The one or multiple groups of validation samples may include samples that are not used in the training process. A group of validation samples may include one or more validation signals as an input of the trained machine learning model and a validation reference signal corresponding to the one or more validation signals. The one or multiple groups of the validation samples may be generated in a manner similar to the generation of the multiple groups of the training samples. In some embodiments, the count (or number) of the multiple groups of the validation samples may be lower than the count (or number) of the multiple groups of the training samples. For example, a ratio of the count (or number) of the multiple groups of the validation samples to the count (or number) of the multiple groups of the training samples may be 7:2, 6:1, etc. In some embodiments, the processing device 120b may adjust the trained machine learning model using the multiple groups of validation samples. For example, if the testing of the trained machine learning model turns out to be unsatisfactory, the processing device 120b may adjust the trained machine learning model based on the multiple groups of validation samples; otherwise, the processing device 120b may designate the trained machine learning model.

Figure 9:
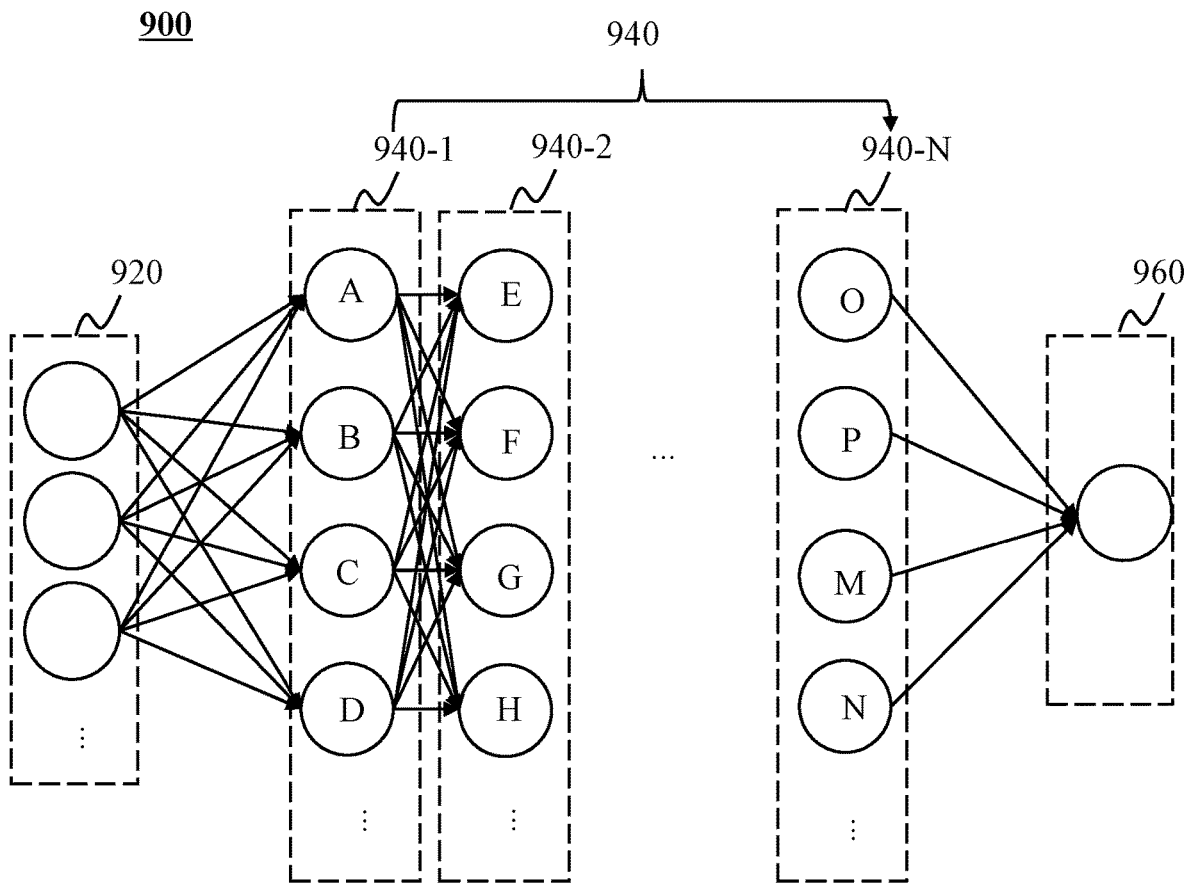
FIG. 9 is a schematic diagram illustrating an exemplary deep learning model according to some embodiments of the present disclosure.

FIG. 9 is a schematic diagram illustrating an exemplary deep learning model according to some embodiments of the present disclosure. As shown in FIG. 9, the deep learning model 900 may be a CNN model that includes an input layer 920, hidden layers 940, and an output layer 960. The multiple hidden layers 940 may include one or more convolutional layers, one or more Rectified Linear Units layers (ReLU layers), one or more pooling layers, one or more fully connected layers, or the like, or a combination thereof.

For illustration purposes, exemplary hidden layers 940 may include a convolutional layer 940-1, a pooling layer 940-2, and a fully connected layer 940-N. As described in connection with process 700, one or more sample signals and a reference signal of a training sample may be obtained as an input of the CNN model and be input in the input layer 920.

The convolutional layer 940-1 may include a plurality of kernels (e.g., A, B, C, and D). For example, the number of the plurality of kernels may be in a range from 16 to 64, e.g., 32. The plurality of kernels may be used to extract features of a training sample (e.g., one or more sample signals and a reference signal of a training sample as described in FIG. 7).

The pooling layer 940-2 may take the output of the convolutional layer 940-1 as an input. The pooling layer 940-2 may include a plurality of pooling nodes (e.g., E, F, G, and H). The plurality of pooling nodes may be used to sample the output of the convolutional layer 940-1, and thus may reduce the computational load of data processing and increase the speed of data processing of the imaging system 100.

The fully connected layer 940-N may include a plurality of neurons (e.g., O, P, M, and N). The plurality of neurons may be connected to a plurality of nodes from the previous layer, such as a pooling layer. In the fully connected layer 940-N, a plurality of vectors corresponding to the plurality of neurons may be determined based on the features of the training sample (e.g., the one or more sample signals and the reference signal of the training sample as described in FIG. 7) and further weigh the plurality of vectors with a plurality of weighting coefficients (i.e., connected weight).

In the output layer 960, an output, such as an estimated signal, may be determined based on the plurality of vectors and weighting coefficients obtained in the fully connected layer 940-N.

It shall be noted that the CNN model may be modified when applied in different conditions. For example, in a training process, a loss function (also referred to as cost function in the disclosure) layer may be added to specify the deviation between an estimated output (e.g., an estimated signal) and a true label (e.g., a reference signal). As another example, in an application process, a first digital signal (e.g., a first signal corresponding to a first sampling frequency as described in FIG. 6) may be input in the input layer 920. The multiple hidden layers 940 may process the first digital signal to generate a second signal (e.g., a second signal corresponding to a second sampling frequency as described in FIG. 6).

In some embodiments, multiple processing units, such as GPUs, in the imaging system 100 may be accessed to perform parallel processing in some layers of the CNN model. The parallel processing may be performed in such a manner that the calculations of different nodes in a layer of the CNN model may be assigned to two or more processing units. For example, one GPU may run the calculations corresponding to kernels A and B, and the other GPU(s) may run the calculations corresponding to kernels C and D in the convolutional layer 940-1. Similarly, the calculations corresponding to different nodes in other type of layers in the CNN model may be performed in parallel by the multiple GPUs.

Figure 10:
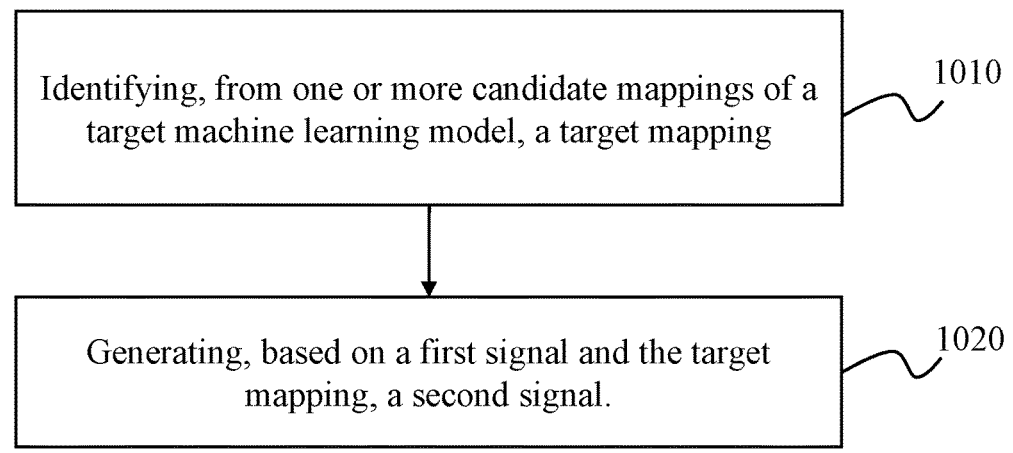
FIG. 10 is a flowchart illustrating an exemplary process for generating a second signal according to some embodiments of the present disclosure.

FIG. 10 is a flowchart illustrating an exemplary process for generating a second signal according to some embodiments of the present disclosure. In some embodiments, one or more operations of process 1000 illustrated in FIG. 10 may be implemented in the imaging system 100 illustrated in FIG. 1. For example, process 00 illustrated in FIG. 10 may be stored in the storage device 130 in the form of instructions, and invoked and/or executed by the processing device 120 (e.g., the processor 210 of the computing device 200 as illustrated in FIG. 2, the GPU 330 or CPU 340 of the mobile device 300 as illustrated in FIG. 3, and or the modules of the processing device 120a as illustrated in FIG. 5A). In some embodiments, the operation 604 in the process 600 may be achieved by operations of the process 1000.

In 1010, the processing device 120a (e.g., the generation module 504) may identify, from one or more candidate mappings of a target machine learning model, a target mapping.

As described in connection with operation 604, the target mapping may be between the first signal corresponding to the first sampling frequency and the second signal corresponding to the second sampling frequency. In some embodiments, the target machine learning model may provide one or more candidate mappings each of which is between signals corresponding to different sampling frequencies. The processing device 120a may obtain the one or more candidate mappings based on the target machine learning model. The processing device 120a may identify, from the one or more candidate mappings of the target machine learning model based on the first sampling frequency and/or the second sampling frequency, the target mapping. For example, the processing device 120a may determine a candidate mapping that is between signals corresponding to the first sampling frequency and the second sampling frequency as the target mapping.

In 1020, the processing device 120a (e.g., the generation module 504) may generate, based on the first signal the target mapping, the second signal.

In some embodiments, the target mapping may include a function conversion between the first signal and the second signal. The processing device 120a may convert the first signal to the second signal based on the conversion function.

It should be noted that the above descriptions of process 1000 are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for signal processing, comprising:
    at least one storage device including a set of instructions; and
    at least one processor in communication with the storage device, wherein when executing the set of instructions, the at least one processor is configured to perform operations including:
        obtaining a first signal that is acquired by sampling, according to a first sampling frequency, an electrical signal of a detector of an emission computed tomography (ECT) device or a gamma camera, wherein the electrical signal is an analog signal and the first signal is a digital signal converted from the electrical signal, the electrical signal is generated by detector units of the detector by detecting radiation rays emitted from annihilation events in a subject after the subject is injected with a radiopharmaceutical;
        generating, based on the first signal and a target machine learning model, a second signal, the second signal being a digital signal corresponding to a second sampling frequency that is different from the first sampling frequency, the target machine learning model specifying a target mapping between the first signal and the second signal;
        obtaining, based on the second signal, photon information of the radiation rays; and
        reconstructing an image of the subject based on the photon information of the radiation rays.

2. The system of claim 1, wherein the second sampling frequency is higher than the first sampling frequency.

3. The system of claim 2, wherein the first sampling frequency is in an order of megahertz (MHZ), and the second sampling frequency is in an order of gigahertz (GHz).

4. The system of claim 1, wherein the generating, based on the first signal and a target machine learning model, a second signal includes:
    inputting the first signal with the first sampling frequency into the target machine learning model; and
    outputting the second signal by the target machine learning model.

5. The system of claim 1, wherein the target machine learning model provides a plurality of candidate mappings, and the generating, based on the first signal and a target machine learning model, a second signal includes:
    identifying, from the plurality of candidate mappings of the target machine learning model and based on the first sampling frequency, the target mapping; and
    generating, based on the first signal and the target mapping, the second signal.

6. The system of claim 5, wherein
    the plurality of candidate mappings include mappings of different first sampling frequencies to a same second sampling frequency, the first signal with the first sampling frequency is input into the target machine learning model, and the target machine learning model is configured to identify the target mapping from the plurality of candidate mappings based on the first sampling frequency, or
    the plurality of candidate mappings include mappings of different first sampling frequencies to different second sampling frequencies, and the first signal with the first sampling frequency and information of a desired second sampling frequency is input into the target machine learning model, and the target machine learning model is configured to identify the target mapping from the plurality of candidate mappings based on the first sampling frequency and the desired second sampling frequency.

7. The system of claim 1, wherein a portion of the at least one processor is within the detector, the target machine learning model is programmed in the detector, and the second signal is generated by the detector.

8. The system of claim 1, wherein the target machine learning model is generated according to operations including:
    obtaining multiple groups of training samples each of which includes one or more sample signals and a reference signal corresponding to the one or more sample signals, wherein the one or more sample signals and the reference signal correspond to different sampling frequencies;
    obtaining an initial machine learning model;
    generating the target machine learning model by training, using the multiple groups of training samples.

9. The system of claim 8, wherein the multiple groups of training samples are obtained by:
    injecting different doses of a radioactive tracer into a sample subject for multiple times or injecting same or different doses of the radioactive tracer into each of multiple sample subjects;
    for each injection, generating one group of the multiple groups of training samples based on an electrical signal corresponding to radiation rays impinged on a sample detector corresponding to the injection, wherein the one or more sample signals are acquired by sampling the electrical signal according to one or more different training sampling frequencies, and the reference signal is acquired by sampling the electrical signal according to a reference sampling frequency.

10. The system of claim 1, wherein the first signal includes a first plurality of sampling points, the first sampling frequency indicates a time interval between two adjacent sampling points of the first plurality of sampling points, and
    the second signal includes a second plurality of sampling points, a time interval between two adjacent sampling points of the second plurality of sampling points being shorter than the time interval between two adjacent sampling points of the first plurality of sampling points corresponding to the first signal.

11. The system of claim 10, wherein a count of the second plurality of sampling points within a time period is greater than a count of the first plurality of sampling points corresponding to the first signal within the same time period.

12. The system of claim 1, wherein the photon information of the radiation rays includes at least one of deposition position information of the incident photons, energy deposition information of the incident photons, or arrival time information of the incident photons.

13. The system of claim 12, wherein the obtaining, based on the second signal, photon information of the radiation rays includes:
obtaining the deposition position information of the incident photons by processing, based on an Anger algorithm, the second signal.

14. The system of claim 12, wherein the obtaining, based on the second signal, photon information of the radiation rays includes:
obtaining the energy deposition information of the incident photons by performing an integral processing on the second signal.

15. The system of claim 12, wherein the obtaining, based on the second signal, photon information of the radiation rays includes:
identifying a time point at which an amplitude of the second signal reaches a threshold amplitude along a rising edge of the second signal; and
obtaining, based on the time point, the arrival time information of the incident photons.

16. A method for signal processing, comprising:
obtaining, by at least one processor, a first signal that is acquired by sampling, according to a first sampling frequency, an electrical signal of a detector of an emission computed tomography (ECT) device or a gamma camera, wherein the electrical signal is an analog signal and the first signal is a digital signal converted from the electrical signal, the electrical signal is generated by detector units of the detector by detecting radiation rays emitted from annihilation events in a subject after the subject is injected with a radiopharmaceutical;
generating, based on the first signal and a target machine learning model, a second signal by the at least one processor, the second signal being a digital signal corresponding to a second sampling frequency that is different from the first sampling frequency, the target machine learning model specifying a target mapping between the first signal and the second signal;
obtaining, by the at least one processor, photon information of the radiation rays based on the second signal; and
reconstructing, by the at least one processor, an image based on the photon information of the radiation rays.

17. A detector of an emission computed tomography (ECT) device or a gamma camera, comprising:
one or more detection units configured to generate an electrical signal by detecting radiation rays emitted from annihilation events in a subject after the subject is injected with a radiopharmaceutical; and
one or more processing circuits configured to:
generate a first signal by sampling, according to a first sampling frequency, the electrical signal, wherein the electrical signal is an analog signal and the first signal is a digital signal converted from the electrical signal; and
generate a second signal based on the first signal and a target machine learning model, the second signal being a digital signal corresponding to a second sampling frequency that is different from the first sampling frequency, the target machine learning model specifying a target mapping between the first signal and the second signal.

18. The detector of any one of claim 17, wherein the target machine learning model is programmed in the one or more processing circuits.

19. The detector of claim 17, wherein each of the one or more detection units includes a crystal component and a photoelectric conversion component;
the crystal component is configured to absorb the radiation rays and generate an optical signal based on the absorbed radiation rays; and
the photoelectric conversion component is configured to convert the optical signal to the electrical signal.

20. The detector of claim 19, wherein the crystal component includes a scintillator, and the photoelectric conversion component includes at least one of a photomultiplier, a positive intrinsic-negative (PIN), or an avalanche photodiode (APD).

* * * * *